(12) United States Patent
Srinivasan

(10) Patent No.: US 9,476,410 B2
(45) Date of Patent: Oct. 25, 2016

(54) OFFSHORE FLOATING PLATFORM WITH OCEAN THERMAL ENERGY CONVERSION SYSTEM

(76) Inventor: Nagan Srinivasan, Missouri City, TX (US)

( * ) Notice: Subject to any disclaimer, the term of this patent is extended or adjusted under 35 U.S.C. 154(b) by 891 days.

(21) Appl. No.: 12/773,013

(22) Filed: May 3, 2010

(65) Prior Publication Data
US 2011/0120126 A1  May 26, 2011

Related U.S. Application Data

(60) Provisional application No. 61/174,495, filed on May 1, 2009.

(51) Int. Cl.
*F03G 7/05*  (2006.01)

(52) U.S. Cl.
CPC . F03G 7/05 (2013.01); *Y02E 10/34* (2013.01)

(58) Field of Classification Search
CPC ................................. F03G 7/05; Y02E 10/34
USPC .................................. 60/394, 641.1–15, 655
See application file for complete search history.

(56) References Cited

U.S. PATENT DOCUMENTS

| | | | |
|---|---|---|---|
| 4,110,628 A * | 8/1978 | Paull et al. ................... 290/1 R |
| 4,189,647 A * | 2/1980 | Wittig .............................. 290/42 |
| 4,210,208 A * | 7/1980 | Shanks ........................... 166/352 |
| 4,372,344 A * | 2/1983 | Stafford ......................... 137/615 |
| 5,513,494 A * | 5/1996 | Flynn et al. .................. 60/641.7 |
| 6,899,492 B1 | 5/2005 | Srinivasan |
| 6,942,427 B1 * | 9/2005 | Srinivasan .................... 405/210 |
| 7,328,578 B1 * | 2/2008 | Saucedo ...................... 60/641.1 |
| 2003/0221603 A1 * | 12/2003 | Horton .......................... 114/264 |
| 2007/0289303 A1 | 12/2007 | Prueitt |
| 2009/0077969 A1 | 3/2009 | Prueitt |
| 2009/0178722 A1 | 7/2009 | Howard |
| 2009/0277612 A1 * | 11/2009 | Poorte et al. ............ 165/104.21 |
| 2010/0050636 A1 * | 3/2010 | Ramamurthy ............... 60/641.7 |

\* cited by examiner

*Primary Examiner* — Hoang Nguyen
(74) *Attorney, Agent, or Firm* — Kenneth A. Roddy

(57) ABSTRACT

An offshore floating platform having at least one buoyant column with an upper end extending above a sea surface, a lower end submerged below the sea surface, and at least one keel tank disposed at the lower end. A deck is supported at the upper end the column. An ocean thermal energy conversion (OTEC) system is integrated with the platform in which heat is extracted from warm sea surface waters to vaporize a liquid working fluid and heat is rejected to cold water from lower depths of the sea to condense the vaporized working fluid. At least one turbine and power generator is disposed on the deck, at least one evaporator is disposed on the platform beneath the deck, and at least one condenser is disposed on the seabed or platform or keel tank a distance beneath the evaporator. A desalination system may also be combined and incorporated with the OTEC system.

11 Claims, 15 Drawing Sheets

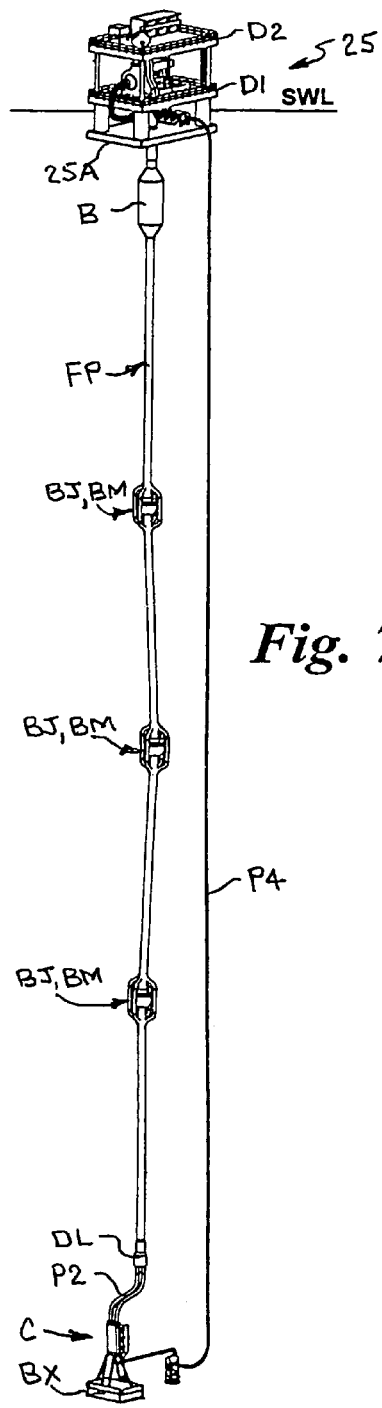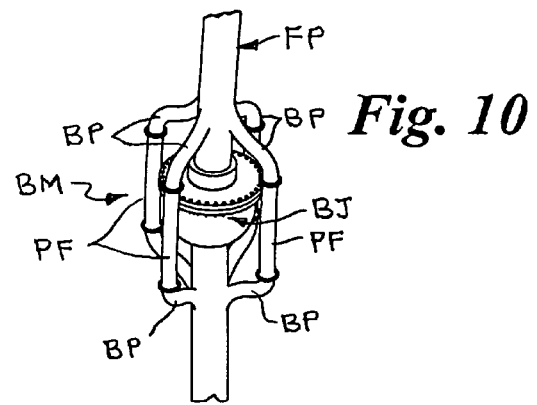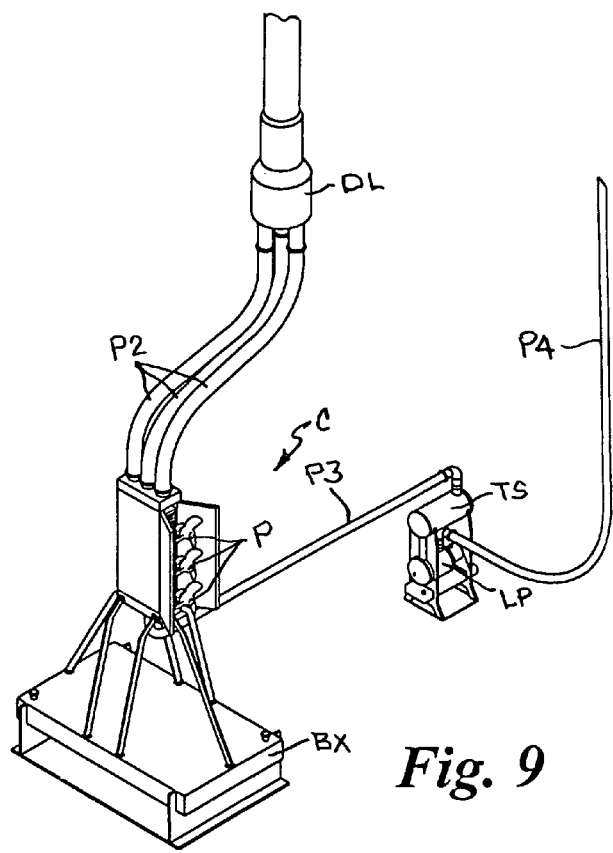

OFFSHORE FLOATING PLATFORM WITH OCEAN THERMAL ENERGY CONVERSION SYSTEM

CROSS REFERENCE TO RELATED APPLICATION

This application claims priority of U.S. Provisional Application Ser. No. 61/174,495 filed May 1, 2009, the pendency of which is extended until May 3, 2010 under 35 U.S.C. 119(e)(3).

BACKGROUND OF THE INVENTION

1. Field of the Invention

This invention relates generally to offshore floating structures, and, more particularly to an offshore floating platform having an ocean thermal energy conversion system.

2. Background Art

Demand for energy worldwide and the need for alternate energy sources is increasing significantly. Ocean Thermal Energy Conversion (OTEC) is a viable alternate energy source which has been in the development stage for the past three to four decades. A great amount of energy is available in deep-ocean environments with temperature difference between an upper surface layer and a lower deep-ocean layer may be within a maximum range of approximately 25° C. in localized offshore locations near equatorial waters. However, the technology is not in commercial operation due to the large capital cost. Advances in heat-exchanger material, cold-water pumps and working-fluid are areas in which extensive research has been done to make OTEC a successful system. However, none of these improvements have made OTEC technology attractive for cost effective commercialization. The present OTEC system provides a feasible OTEC system for about 100 MW power plants with significant differences and advantages over conventional systems. The present OTEC system reduces the capital cost significantly and makes OTEC technology commercial feasible. The present OTEC system which is supported in new types of floating vessels, or "floaters" achieves cost efficiency and reduces the capital cost of the OTEC system compared to conventional OTEC systems. Both the new OTEC system and the supporting floater system are presented herein.

One of the popular renewable solar energy sources is the ocean using the temperature differences that exists between warm water at the upper surface layer and cold water in the lower deep-ocean layer. The process that uses this natural thermal gradient is known as Ocean Thermal Energy Conversion (OTEC). The deep ocean is a natural storage basin for solar energy that could be available to tap all day around. The minimum temperature difference between the warm surface-water and the deep cold-water required is 20° centigrade in order for the OTEC system to produce a significant amount of electric power. Thus, the ocean is the vast source of renewable energy, with the potential to produce billions of watts of electric power. The feasible locations that have sufficient temperature differences existing between the surface and deep-ocean layers are in deep ocean areas near the equator.

A conventional OTEC closed cycle power plant engine design typically uses standard heat-engine cycles which are used in power plants wherein the heat from the burning fuel is converted into electrical power. The primary components of the OTEC power plants are: the heat exchangers, the cold water pipe, the working fluid, the supporting ocean platform, and the underwater transmission lines. Ammonia with a low boiling point is typically used for the working fluid of the OTEC closed cycle system. An evaporator is used to vaporize the working fluid with the help of the pumped warm surface seawater. The turbine is rotated by expending the heat-energy of the ammonia vapor that comes out from the evaporator. The ammonia that flows out from the turbine is cycled through the condenser to cool the ammonia vapor causing it to become liquid. The cold water obtained from the deep ocean layer is used for the condenser function. The thermodynamic cycle continues and stabilizes to produce electricity without the need of burning an external fuel to produce the heat-energy in the OTEC cycle. The OTEC system is classified as an open-cycle and a hybrid-cycle. Different working fluid alternates have been studied by researchers to improve efficiency.

The conventional OTEC power plant is typically supported on a floating barge which is operated in deepwater locations where the required temperature difference is available. Although there is no need for external fuel for the OTEC engine and it is obtained free from ocean thermal energy, the success of the OTEC power plant predominantly depends on the capital cost of the plant and the cost per kilowatt hour of the energy produced. Previous studies show that OTEC could be more economical if designed for large power output. In order to produce a large power output, the conventional OTEC power plant requires a very large diameter cold-water intake pipeline extended to a depth of approximately 3000 ft in the water and is supported at the top by the vessel. The pipe is to be designed for wave environmental loads. The vortex induced oscillations also could be a significant problem due to underwater ocean current. Secondly, the heat exchanger, especially the condenser, required for the large OTEC plants is expensive due to its size and weight. Another problem is that a large amount of water needs to be moved from the deep-ocean layer to the surface and handled on the vessel to be used in the condenser. This also makes the conventional OTEC system inefficient and cost sensitive.

If OTEC could become cost competitive with the rest of alternate energy resources, then billions of watts of electric power could be produced from the OTEC system. Bringing the OTEC system capital cost down is a real challenge faced by engineers and scientists. The present invention provides a method that significantly reduces the OTEC system cost, and makes the OTEC system feasible.

Several costs are involved in a typical conventional OTEC system OTEC system. The platform, installation, equipment system, underwater cable, cable installation, maintenance, management, marketing, local infrastructures are some of the cost divisions built into an OTEC project that would effect the total capital cost. The vessel and equipment costs are predominant in the conventional system, and are significantly reduced by the innovative design of the present system.

Referring now to Table 1, below, the cost for a conventional ship-shaped floating unit having with a conventional OTEC system with a 100 MW output is shown. The costs are approximate estimations, and a more detailed cost could be obtained from a detailed analysis for a specific location. The total cost obtained from Table 1 is $420 million US dollars. The capital cost of the 100 W conventional power plant depends a great deal on the cost of the heat exchanger unit. Thus, it would be desirable to improve the design to reduce the cost of the heat exchanger. Even if a cost effective cold water pipe of composite material were utilized, the cost is still not significantly controllable for large units. Small units are not beneficial to the location, and not cost effective due to the size of the supporting vessel. Because of the large size of the cold water pipe, it is difficult to handle from the surface floating vessel in harsh environments. If buoy-type connect and disconnect features are added to the cold water pipe, that cost is also added to the design. Again, the vessel designed to support the conventional OTEC is sensitive to storms and harsh environments. That poses large operational costs to the OTEC system in a deep sea. Thus, the overall $420 million US dollar capital cost for a 100 MW power plant is not attractive for commercialization.

TABLE 1

| Sl. No | OTEC System Components | % Cost | Million US $ |
|---|---|---|---|
| 1 | Platform Vessel Structure | 17% | 70 |
| 2 | Turbine Generator & Pumps | 18% | 75 |
| 3 | Evaporator | 21% | 90 |
| 4 | Condenser | 21% | 90 |
| 5 | Cold-Water Pipe | 2.5% | 10 |
| 6 | Subsidiary Equipment | 3.5% | 15 |
| 7 | Working Fluid | 2.5% | 10 |
| 8 | Underwater Cable | 5% | 20 |
| 9 | Installation Cost | 5% | 20 |
| 10 | Operational & Maintenance Cost | 5% | 20 |
|  | Total Cost | 100% | 420 |

Heat transfer is the major engineering task to be involved in the success of any efficient OTEC power plant. Conventional OTEC systems perform the heat transfer effort on the top of the platform deck. The amount of water needed to cool the working fluid is enormous. Conventional OTEC systems typically utilize a very large diameter cold water pipe to bring the cold water from the depth of about 3,000 ft. to the free surface where the condenser is located to condense the vapor or gas into a liquid after it leaves the turbine, and the warm surface water is used at the evaporator in the gas heating process to produce the vapor or gas which is transported to the turbine. The large diameter cold-water intake pipe extending from a depth of approximately 3,000 ft. in the water is supported at the top by the vessel, and must be designed for environmental wave loads. The cold water pipe is massive and is subject to vortex induced oscillations due to underwater ocean current and huge stresses at the joint between the cold water pipe and the OTEC platform resulting from a combination of severe weather, wave action, and the length, diameter, and mass of the cold water pipe. Thus, in the conventional OTEC system, an enormous amount of heavy equipment is used for handling large volumes of water on the surface of the floating vessel, which requires an increase in the vessel size and consequently a very high capital cost.

This requirement for large capital costs has contributed to the lack commercial operation of the OTEC technology. Advances in heat-exchanger material, cold-water pumps and working-fluid are areas in which extensive research has been done to make OTEC a successful system. However, none of these improvements have made OTEC technology attractive for cost effective commercialization.

Prueitt, U.S. Published Patent Application 2007/0289303 discloses a system for heat transfer for OTEC (Ocean Thermal Energy Conversion), wherein rather than transferring huge quantities of cold water from deep in the ocean to the surface to provide a heat sink for a heat engine or for desalination, the invention provides a method of using small masses of low-boiling-point fluids to absorb heat in a heat exchanger near the ocean surface using the latent heat of evaporation and then depositing the latent heat of condensation in a deep ocean heat exchanger, using the cold seawater as a heat sink. The condensed liquid is pumped back to the ocean surface. The heat engine (turbine) and generator can be at the ocean surface, or it can be in deep ocean water. By using a fluid that transfers heat by evaporation and condensation, much larger quantities of heat can be moved per kilogram of fluid than can be transferred by moving the same mass of seawater.

Prueitt, U.S. Published Patent Application 2009/0077969 discloses heat transfer methods for OTEC (Ocean Thermal Energy Conversion) and desalination which produce fresh water from seawater on both the boiler side and the condenser side of an OTEC power plant. Part of the warm ocean surface water is evaporated, and its vapor transfers heat to the working-fluid boiler as the vapor condenses. The condensation of the vapor provides fresh water. On the condenser side, the condensation of the working-fluid vapor from the turbine in the condenser releases heat that evaporates seawater that runs down the outside of the condenser surfaces. The vapor from the seawater is condensed by a heat exchanger that uses input from colder seawater. As the cold seawater accepts heat from the condensing vapor, it becomes slightly warmer and provides the source of seawater that accepts heat from the condenser. The condensing vapor on the heat exchanger becomes fresh water that is drawn out as potable water. To provide additional fresh water, a multistage desalination unit uses the warm water discharge and the cold-water discharge from the OTEC plant to provide a temperature gradient that causes evaporation and condensation in each stage of the unit.

Howard, U.S. Published Patent Application 2009/0178722 discloses a system for relieving the stress on an Ocean Thermal Energy Conversion (OTEC) cold water pipe which includes a slidable joint that couples the OTEC cold water pipe to a surge tank at an opening in the surge tank. The system may further include a first flotation device that is coupled to the OTEC cold water pipe below the surge tank, and a second flotation device that is coupled to the OTEC cold water pipe within the surge tank.

SUMMARY OF THE INVENTION

The present system overcomes the aforementioned problems and is distinguished over the prior art in general, and these patents in particular, by an OTEC hybrid cycle powerplant engine that is supported on a floating platform or vessel which significantly reduces the length or completely eliminates the massive cold water pipe and allows the condenser to be placed near the surface of the seabed at about 3,000 ft. below the free water surface. The floating platform has at least one buoyant column with an upper end extending above a sea surface, a lower end submerged below the sea surface, and at least one keel tank disposed at the lower end. A deck is supported at the upper end the column. An ocean thermal energy conversion (OTEC) system is integrated with the platform in which heat is extracted from warm sea surface waters to vaporize a working fluid liquid and heat is rejected to cold water collected from lower depths of the sea to condense the working fluid vapor. In some embodiments, a turbine and a power generator are disposed on the deck, an evaporator is disposed on the platform beneath the deck, and a condenser is disposed on the platform or keel tank a distance beneath the evaporator. The weight of the condenser acts as a fixed ballast to increase the stability of the platform.

In some embodiments, the present OTEC engine incorporates subsea condensers, subsea pumps, submerged evaporators and independently movable or flexible buoyant free standing vertical flow pipes to transport working fluid from the turbine outlet to the subsea condensers. The condenser is located in a subsea area where the enormous cold water is available without the need of storage. The condenser is directly exposed to the underwater environment of about 4° C. and is designed to withstand 1,500 psi water pressure and operate at approximately 3,000 ft. depths. The condenser is also provided with propellers that conduct the cold water of about 4° C. of the environment across the exposed condenser. Thus, the need for pumping in and pumping out of water inside the condenser required in conventional OTEC systems is eliminated.

The present OTEC system reduces the capital cost significantly and provides significant differences and advantages over the conventional OTEC systems and makes it commercially feasible to provide OTEC systems having about 100 MW power plants. The present OTEC system which is supported in new types of floating vessels, or "floaters" achieves cost efficiency and reduces the capital cost of the OTEC system compared to conventional OTEC systems.

BRIEF DESCRIPTION OF THE DRAWINGS

FIG. 7 is a perspective view of a semi-submersible floating platform with telescopic keel tank having a 20 MW ocean thermal energy conversion system in accordance with the present invention.

FIG. 9 is a perspective view showing the submerged condenser at the lower end of the buoyant free standing vertical flow pipe in greater detail.

FIG. 10 is a perspective view showing the ball joint and bypass manifold of the buoyant free standing vertical flow pipe in greater detail.

DESCRIPTION OF THE PREFERRED EMBODIMENTS

Figure 1:
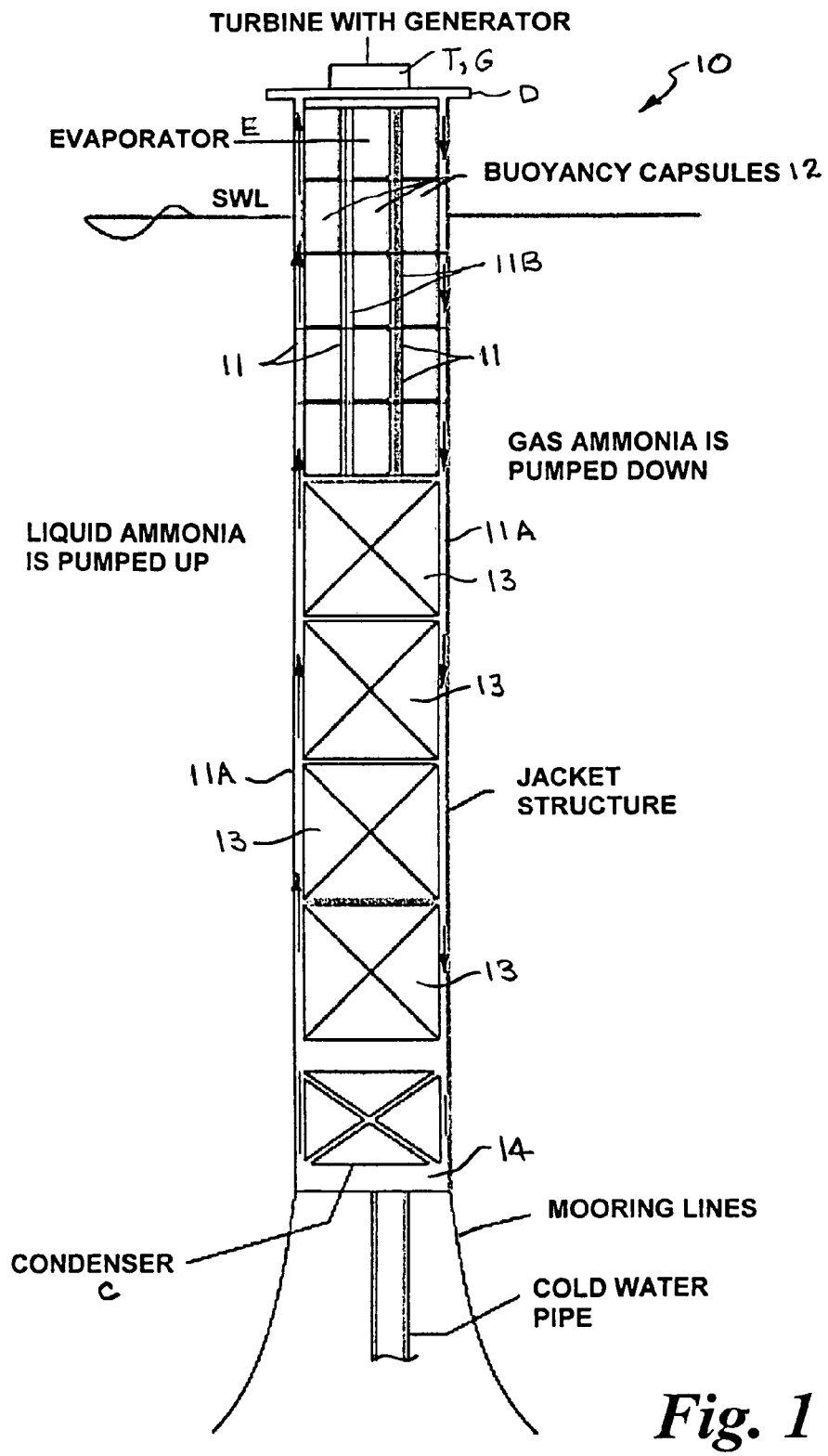
FIG. 1 is a side elevation showing somewhat schematically, an embodiment of an offshore floating Jacket-Spar platform having an ocean thermal energy conversion system in accordance with the present invention.

The present offshore floating platforms having an ocean thermal energy conversion system controls platform construction and operational costs by utilizing a supporting platform particularly suited for the OTEC system. For example, a few types of deepwater offshore platforms are easy to fabricate but expensive to install. There are some vessels that are designed to be self-installed and mobile. The present invention utilizes such a platform. The present invention also incorporates independently movable or flexible buoyant free standing vertical flow pipes to transport working fluid from the turbine outlet to the subsea condensers.

The main technical challenge in an OTEC system is the large amount of warm and cold sea water to be used for the heat transfer processes. Typically, a 100 MW OTEC system requires 5,000 cubic ft. per second of cold water to be transported to the free surface from the deep ocean depth. Similarly, 8,000 cubic ft per second of surface warm water is to be pumped into the evaporator located on the platform. In a conventional system, the cold water pipe would need to be at least 28 ft. in diameter and 3,000 ft. long for pumping the cold water to the condenser located at the top of the vessel. Obviously such a large amount of fluid transmission from the deep ocean depth to the surface water is not economical. In an alternate design, as described hereinafter, the cold water flow may be passed through multiple condensers to maximize the cold-water utilization. Multiple turbine units not exceeding 20 MW output may be used in one floating vessel.

The feasible locations for installation of an OTEC system are in deep ocean areas near the equator because of the significant temperature differences existing between the surface and deep-ocean layers. For example, in the waters off of the island of the Jamaica, the temperature drops significantly from the free surface to a depth of about 400 m. Then, from the 400 m depth to a depth of about 600 m, the rate of change in temperature is reduced. From a depth of from about 600 m to 1,000 m, the temperature change is only a few degrees centigrade. The present invention takes advantage of this situation by moving the condenser from the platform to a deepwater location whereby the working fluid is pumped from the top surface to the deepwater location where the condenser is located. This reduces the need to bring the cold water pipe from the deepwater to all the way to the top of the platform. When the condenser is placed in a relatively colder atmosphere, then the efficiency of the condenser is improved. By incorporating this feature, the amount of water needed to be handled at the surface is simply eliminated. Supporting the condenser at the deepwater depth is achieved with the present floating vessel and the cold water pipe is not directly exposed to the harsh ocean environment. However, the supporting vessel is preferably designed for harsh environments, since the condenser is now at a deeper location. The cold water pipe integration to the vessel structure is not critical if the vessel movements are small for large waves.

Placing the condenser in deep water provides a large cost saving to the over all OTEC system, since the condenser weight and the amount of water to be handled at the platform deck are removed. Large weight saving to the surface vessel is also achieved. The cold water pipe length is also reduced significantly to approximately two-thirds. Pumping of the working fluid from the gas turbine to the underwater condenser and then bringing the cold working fluid back in liquid form to the evaporator at the top of the platform is achieved by two additional pumps: one to pump the working fluid, such as ammonia gas, to the condenser, and the second to pump the liquid working fluid from the condenser to the evaporator. The second pump is a commercially available underwater pump of the type used in subsea applications in the oil industry.

As used herein, the term "working fluid" means the fluid that is used in a thermodynamic heat transfer process and is capable of changing between a liquid and a vapor or gas when passed through a condenser and an evaporator. Examples of working fluids include: ammonia (NH3), Carbon Dioxide (CO2), propane, refrigerants, R-134, steam, and mixtures thereof.

Jacket-Spar Floating Platform with OTEC

Figure 2:
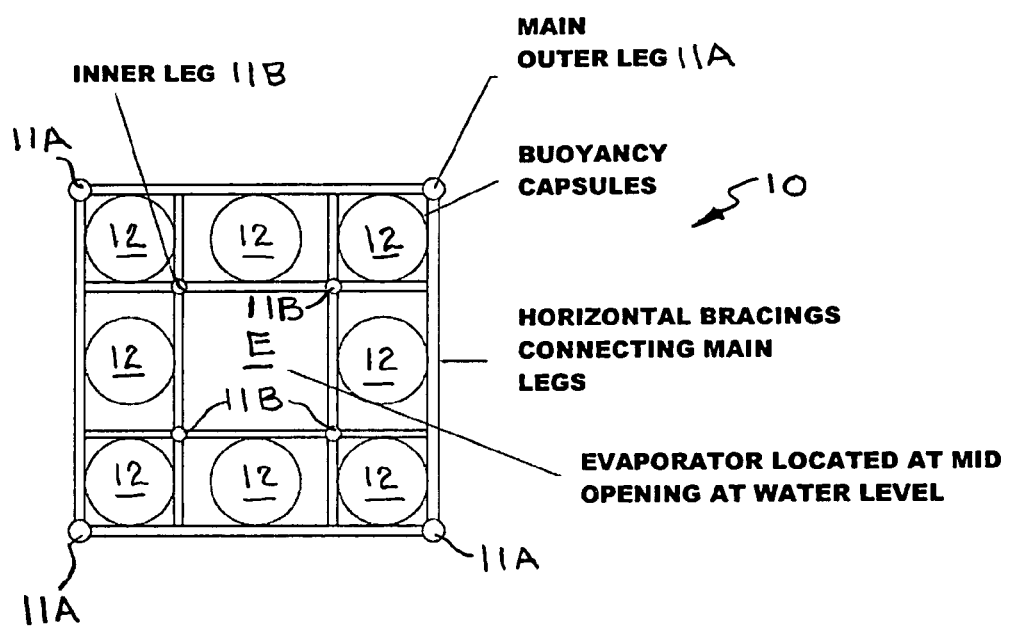
FIG. 2 is a transverse cross sectional view showing somewhat schematically, the jacket frame and buoyancy capsules of the offshore floating Jacket-Spar platform.

FIGS. 1 and 2 show somewhat schematically, an embodiment of an offshore floating Jacket-Spar platform 10 having an ocean thermal energy conversion system in accordance with the present invention. This floating platform is similar to the jacketed platforms shown and described in greater detail in my U.S. Pat. No. 6,899,492, which is hereby incorporated herein by reference in its entirety. This embodiment completely eliminates the need to extend the cold water pipe to the platform deck D, and allows the condenser C to be placed below the free water surface near the surface of the seabed. The Jacket Spar, also known as a "J-Spar" is a simple jacket frame structure that is made of tubular steel members with welded connections. The deck D is supported by eight legs 11 at the top. There are four outer legs 11A and four inner legs 11B. The turbines T and the generators G are disposed on the deck structure. Pressure vessel type buoyancy capsules 12 are used inside the jacket to provide sufficient upward force to support the deck. The jacket frame is neutrally buoyant and thus presents no penalty for using the jacket structure to entrap the buoyancy capsules in a floating vessel design. The hydrostatic stability of the J-Spar is similar to a conventional Spar. The J-Spar preferably incorporates permanent ballast for hydrostatic stability. The condenser structure is also partly utilized for this purpose. Multiple submerged keel tanks 13 are disposed well below the buoyancy capsules 12 and are supported by the four downwardly extended outer jacket legs. The keel tanks are used with additional heavy ballast to bring the center of gravity down below the center of buoyancy of the vessel. The weight of the condenser C located in or on the keel tank becomes the functional part of the J-Spar to stabilize the vessel. A few of the buoyancy capsules are dedicated to support the evaporator E near free surface area but are submerged. The outer legs 11A are used to transport the working fluid between the turbine T, condenser C and evaporator E. Thus, the functionality of the OTEC system and the J-Spar structures are merged into one unit. Unlike a conventional truss Spar, the J-Spar is feasible to fabricate in any shipyard in many parts of the world.

Table 2, below provides an example of the components of a J-Spar design. Because of the simplicity in the design and construction, the J-Spar reduces engineering and fabrication effort and the related costs. Because of the modular construction, the hull fabrication is significantly simplified. Notably, the buoyancy capsules 12 are further modularized into small lengths to fit in between the two horizontal bracings of the jacket frame. Appropriate load transfer mechanism between the buoyancy capsules and the jacket frame is established. The J-Spar is suitable for small to medium deck payloads in deepwater depths ranges from about 2,000 ft. to about 4,000 ft.

The J-Spar, because of its natural configuration, is not affected by the underwater current induced vortex shedding loads. The jacket and the multiple cylinder buoyancy capsules 12 suppress the alternate formation of the Karman's vortex streets produced by the underwater currents. The cold water pipe is hung at the lower keel-tank 14. That also provides additional stability to the J-Spar and controls the roll and pitch motions predominantly. The J-Spar truly enhances the OTEC system efficiency and reduces the cost by placing the condenser C below 1,000 ft. Many of the OTEC components are integral structural components of the J-Spar and the length of the cold water pipe is significantly reduced.

TABLE 2

Design Particulars of a Typical Jacket Spar

| Description | Items | Details |
|---|---|---|
| Water Depth | Range | 3000 |
| Topside Details | Weight | 10000 kips |
| Jacket Hull | Size | 81 ft × 81 ft × 1000 ft |
| | Draft | 540 ft |
| | Number of 600 ft long Outer Legs | 4 |
| | Number of 200 ft long Inner Legs | 4 |
| | Center Well Opening | 32 ft × 32 ft |
| | Jacket Weight | 8000 kips |
| Buoyancy Hull | Capsule Diameter | 20 ft |
| | Capsule Length | 40 ft |
| | Capsule Composite Material Wt | 80 kip (each) |
| | Number of Capsules Used | 40 |
| | Total Capsule Weight | 3,200 kips |
| | Total Buoyancy Provided by Capsules | 45,840 kips |

Tension Base Tension Leg Platform with OTEC

The J-Spar has design limitations in locating the condenser at depths below about 1,000 ft. from the free surface water depth. However, the efficiency and the cost of the present OTEC system can be enhanced more if the condenser is located below about 2,000 ft where the water temperature is much cooler and the efficiency of the condenser is further increased. Secondly, the length of the cold water pipe would also be significantly decreased.

Figure 3:
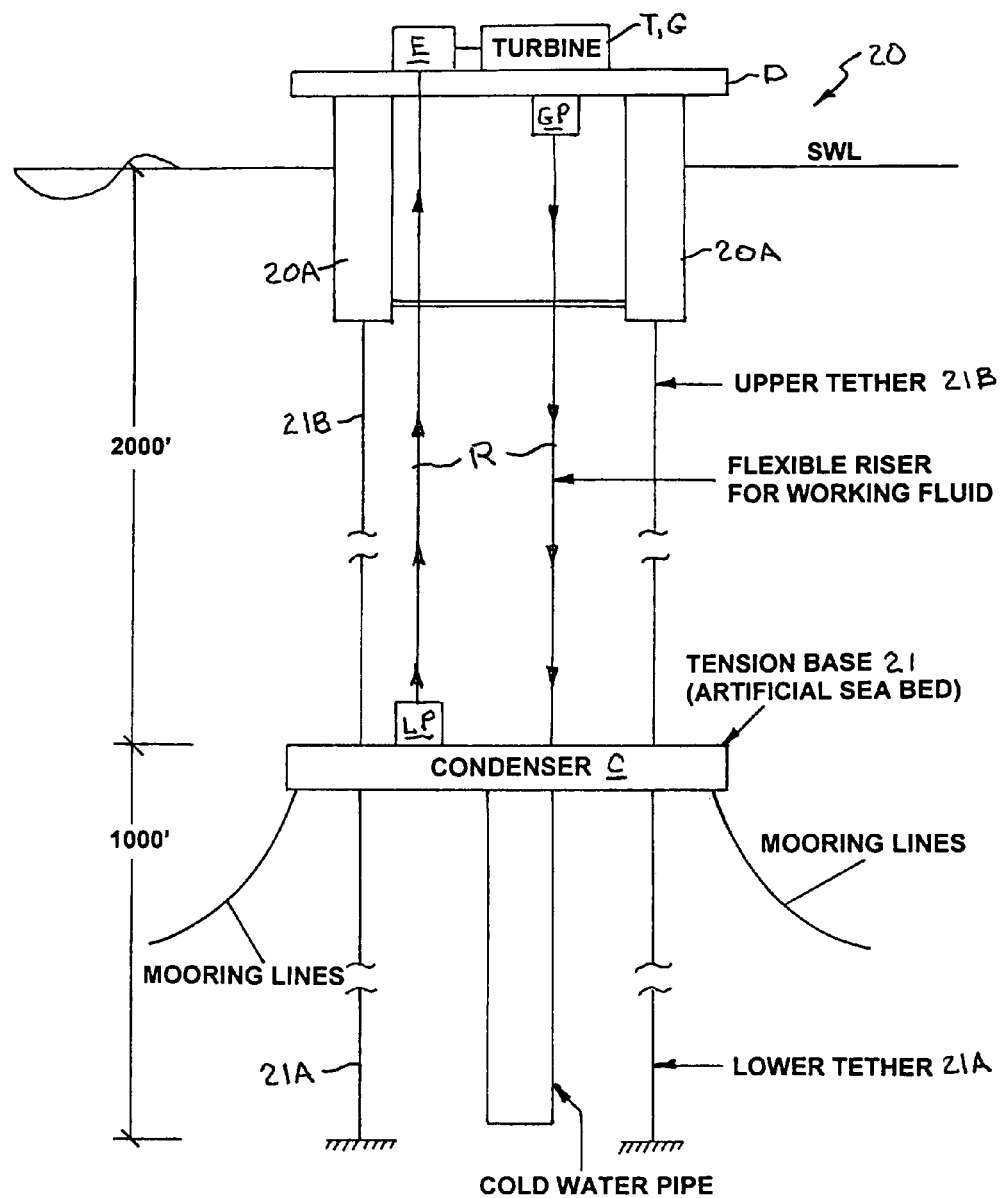
FIG. 3 is a side elevation showing somewhat schematically, an embodiment of an offshore floating Tension Base Tension Leg Platform (TBTLP) having an ocean thermal energy conversion system in accordance with the present invention.

This is accomplished by the present offshore floating Tension Base Tension Leg Platform (TBTLP) 20 having an ocean thermal energy conversion system in accordance with the present invention, as shown schematically in FIG. 3.

A tension leg platform (TLP) behaves like a fixed platform but with large sway and surge motions in severe storms. With tension base tension leg platforms (TBTLP) 20 an artificial seabed 21 or "tension base" is utilized at an intermediate depth from the actual seabed to support the TLP vessel tether system. Thus, the effective water depth of the upper portion of the TLP is reduced. As shown in FIG. 3, the artificial seabed or tension base 21 is a flat plated structure with its own downwardly extending tension tethers 21A. The artificial seabed 21 is called a tension base because it is supported by tethers 21A in tension. No additional tension means are needed to support the tension base 21 as the tension applied to the upper vessel can hold the tension base under stable tension. Additional moorings may be used for the lower tension base if needed. The upper tension leg platform legs 20A are independently tethered by upper tethers 21B to the tension base 21. The TBTLP vessel 20 reduces the tether length relative to the location of the tension base. This enhances the capacity of the tethers and reduces the sway and surge motion of the TLP 20.

In the present TBTLP 20, the condenser C is placed within or on the structure of the tension base 21 located approximately 2,000 ft. below the water surface. The cold water pipe is hung from the tension base 21 to extend the required water depth to receive cold water. Thus, the length of the cold water pipe is significantly reduced to about one-third of the water depth compared to a conventional OTEC system. In this embodiment, the turbine T, generator G, and evaporator E of the OTEC system are supported on the deck D. Flexible risers R are used to transport the working fluid from the turbine T to the condenser C with the help of a gas pump GP located on the deck. Then an underwater subsea liquid pump LP is used to raise the working fluid to the evaporator E located on the deck.

Thus, the present TBTLP provides an alternate means to support the OTEC system with the condenser C submerged at water depth of about 2,000 ft., and provides significant cost benefits. The thermodynamic efficiency of the OTEC also is increased because the condenser C is now in a colder location. The tension base 21 has a large area available to work with and allows a large condenser to be provided for enhanced efficiency. The tension base 21 is subject to large water pressure and, thus, the platform 20 may incorporate structural features that allow water to pass through the interior to compensate for the external water pressure. The tension base 21 carries the vertical added mass and thus the vertical heave period is increased in deepwater. Because of the large added mass acting on the tension base 21, the tension base is stationary without heave and pitch motion. The sway and surge of the tension base is also well controlled by mooring lines attaching the tension base 21 to the actual seabed.

A buoyant head connected to the top of the cold water pipe may be provided for the ease of mounting the pipe to the base bottom. ROV or wire lines may be used to install the underwater pipe. Another option is to integrate the cold water pipe into the tension base when lowered down during installation. The cold water pipe and the tension base with the inbuilt condenser are not subjected to wave and current load at deepwater depths such as 2,000 ft. The flexible risers are used to transport working fluid up and down with the help of the underwater pumps located on the tension base.

Semi-Submersible Platform with OTEC

Figure 4:
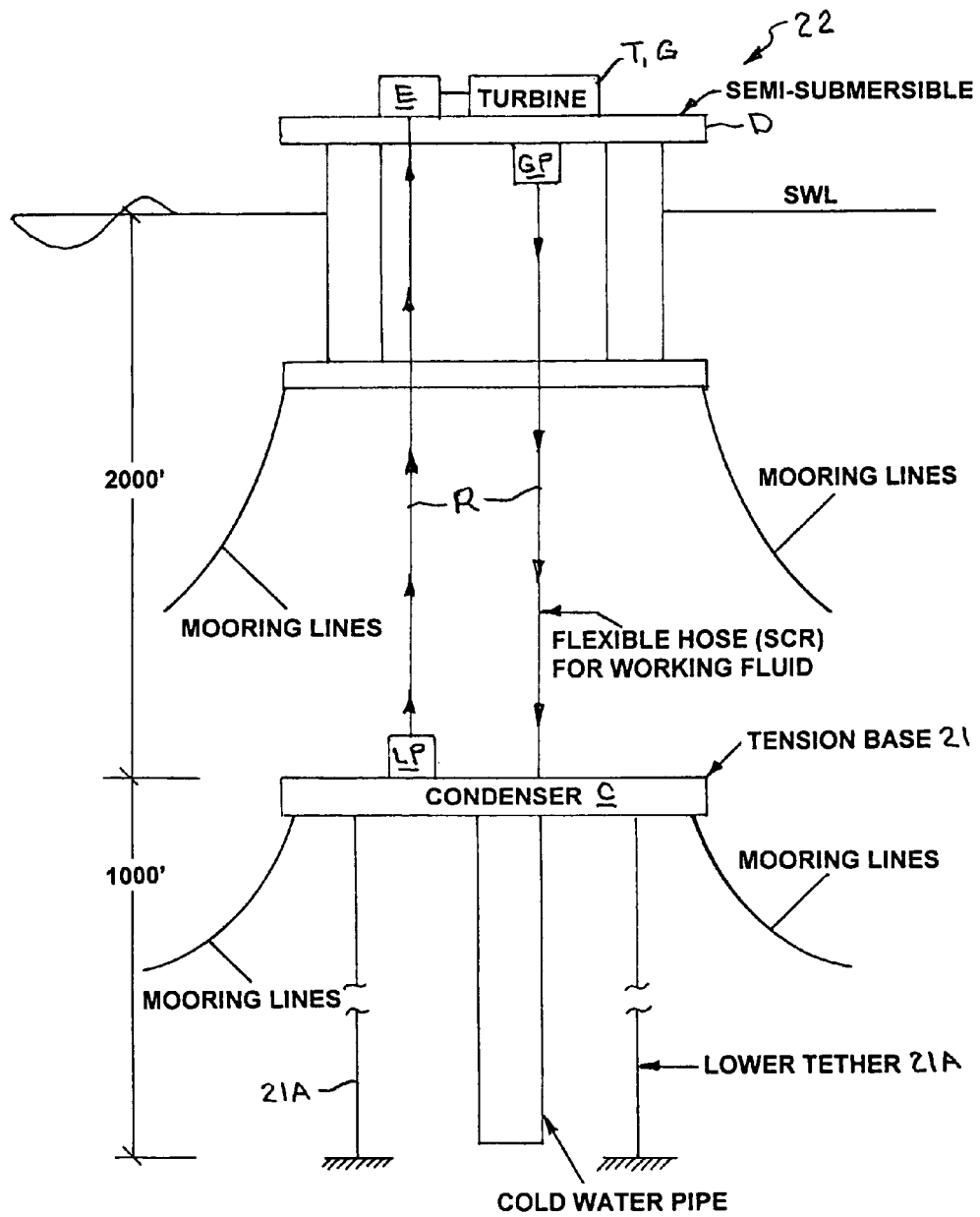
FIG. 4 is a side elevation showing somewhat schematically, an embodiment of a semi-submersible floating platform having an ocean thermal energy conversion system in accordance with the present invention.

Alternatively, as shown in FIG. 4, instead of using a tension leg platform (TLP) above the tension base, a semi-submersible vessel 22 having a keel tank 22A may be used to support the present OTEC system. The components previously described above with reference FIG. 3 are assigned the same numerals of reference but will not be described again in detail to avoid repetition. The advantages of this embodiment are that the upper tethers 21B are replaced by mooring lines and, thus, the semi-submersible can be mobile. The flexible risers R in this embodiment are disconnectable, such that the semi-submersible can be relocated depending on the weather conditions and as needed.

Semi-Submersible Platform with OTEC and Telescopic Keel Tank

Figure 5:
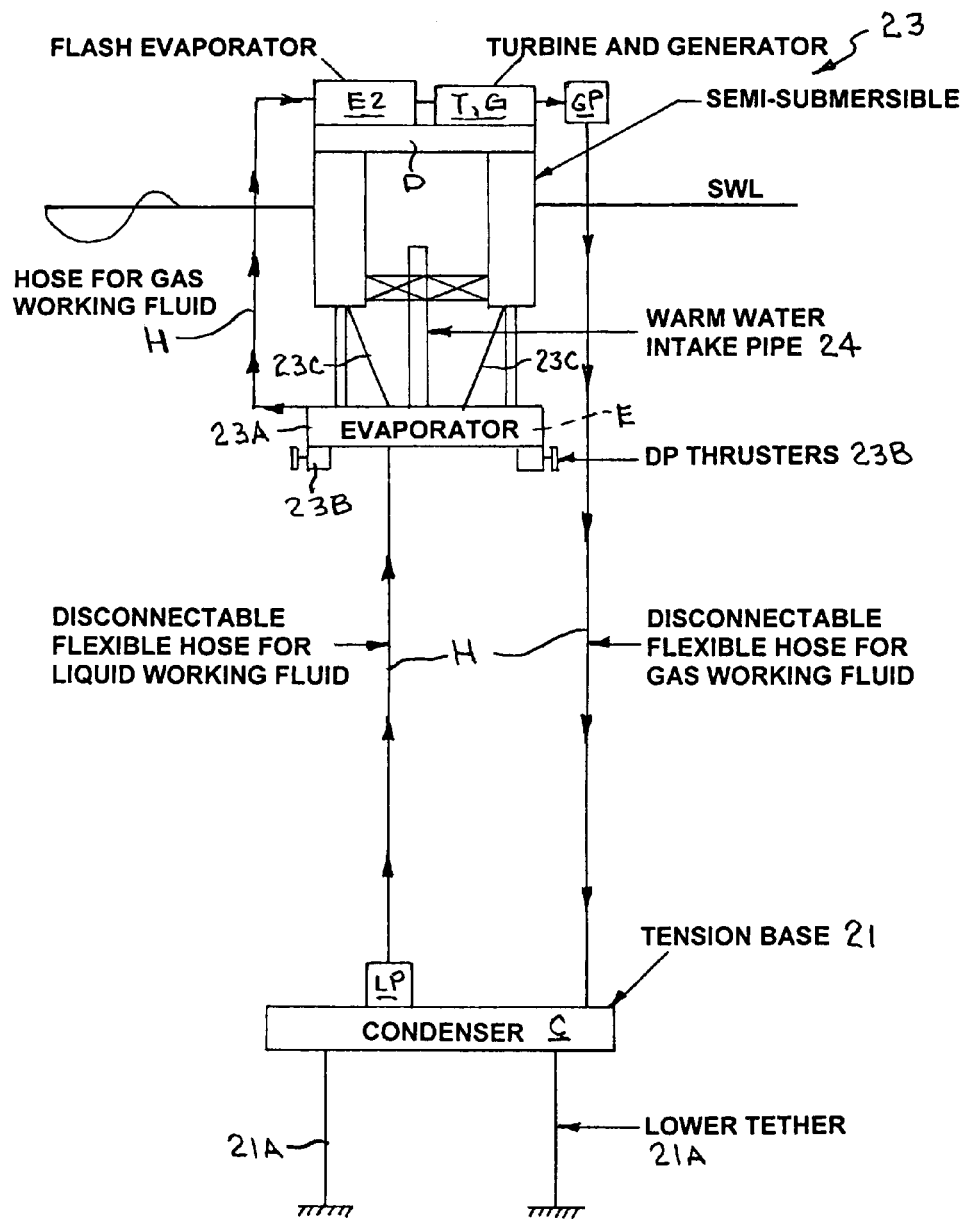
FIG. 5 is a side elevation showing somewhat schematically, an embodiment of a semi-submersible floating platform having an ocean thermal energy conversion system and a telescopic keel tank in accordance with the present invention.

FIG. 5 shows somewhat schematically, an embodiment of a semi-submersible floating platform 23 having an ocean thermal energy conversion system and a telescopic keel tank 23A in accordance with the present invention, which is suited for use in ultra deepwater with harsh environment applications. The components previously described above with reference FIG. 3 are assigned the same numerals of reference but will not be described again in detail to avoid repetition. This semi-submersible floating platform is similar to the platforms with telescopic keel tanks shown and described in greater detail in my published pending patent application 2009/0205554, which is hereby incorporated herein by reference in its entirety. This embodiment completely eliminates the need of a cold water pipe, and allows the condenser C to be placed near the surface of the seabed at about 3,000 ft. below the free water surface. This embodiment also allows dynamic positioning (DP). As with the previous embodiments, many components of the OTEC system are used as parts of the platform. The deck payload is increased significantly since there is no need for the condenser, cold water pipe and cold water storage on the deck. Thus, the floating support vessel is very light due to just supporting the turbine and other necessary equipment. An accommodation module and a heliport deck may be installed on the deck (not shown). Thus the overall weight of the supporting vessel is reduced for cost efficiency.

The natural periods of the vessel heave, pitch and roll are very large compared to the possible wave periods that could occur in the ocean. This is achieved by the help of the telescopic keel tank used during operation with extended deep draft feasibility. A first evaporator E is disposed inside or on the telescopic keel tank 23A in addition to the necessary buoyancy chambers for operation. Dynamic positioning DP thrusters 23B are provided on the keel tank 23A for mobility. The vessel, then on-site, lowers the telescopic keel tank 23A and locks it in the extended position with knee braces 23C.

The buoyancy of the keel tank 23A is used to telescope the keel tank up and down by flooding water in and out of the ballast tanks. The vessel is a self-elevated and self-installed with no need for external installation vessel help. The vessel in a transport condition is compact in height with the keel tank 23A retracted. The vessel may carry the entire hull and its topside load with the keel tank in its transport condition.

The feasibility of mobility and relocation of the vessel in this embodiment is very attractive and risk free. Suppose a location is not producing the electric power due to the weather conditions for a certain period of the year and another potential location could be found in an alternate location, then the OTEC plant could be relocated to the new location.

The condenser C is disposed approximately 200 ft. above the seabed at a water depth of approximately 3,000 ft. The overall water depth is approximately 3,200 ft. The condenser C may be designed as an integral part of the tension base 21 with tethers for support. The condenser C may be designed larger than the required size to cool the gas working fluid to the liquid form. The condenser C is directly exposed to the seawater at 3,000 ft and, thus, the need for a cold water pipe is completely eliminated. Also, most importantly there is no need of cold water circulation required inside the condenser C as it is exposed directly to the cold water sea environment at the 3,000 ft. water depth.

The inlet and the outlet of the condenser C are connected with flexible risers or hoses H to transport the working fluid into and out of the condenser. A subsea pump liquid LP is disposed on the tension base 21 to pump the liquid working fluid from the condenser C to the first evaporator E located in the keel tank 23A of the floating vessel.

The condenser C with the flexible risers and the attached subsea pump P may be gently lowered to the seabed. The foundation of the tension base system can sit on the seabed, and can be lifted up and relocated to a new location. The flexible risers or hoses H are designed to be disconnected from and reconnected to the floating vessel to make relocation of the entire OTEC system feasible.

The evaporator E located on the telescopic keel tank 23A is supplied with warm water from the near free water surface. A warm water intake pipe 24 is attached to the keel tank 23A, and a flash chamber or second evaporator E2 is located atop the deck D to further expand the heat of the gas working fluid sent to the turbine input to operate the turbine. The gas working fluid output from the turbine T is pumped by a gas pump GP through the flexible risers or hoses H to the condenser C located at about 3,000 ft below the free-surface.

The condenser C cools the gas working fluid and converts it into liquid working fluid. The subsea liquid pump LP on the tension base housing is operated from the surface of the vessel with an umbilical connection. The subsea pump LP transports the liquid working fluid up to the evaporator E located in the keel tank 23A. The evaporator E receives the warm water from the near free water surface through the warm water intake pipe 24. The evaporator E heats the liquid working fluid into a vapor or gas and provides heat energy to the working fluid. A second gas pump (not shown) located inside the keel tank 23A inline with the evaporator output, pumps the gas working fluid to the flash chamber or second evaporator E2 located on top of the platform. Thus, the gas working fluid is further augmented with heat energy ready for input to the turbine T for work. The turbine T is rotated with the heat energy expended and the exhausted gas working fluid discharged out of the outlet of the turbine for recycling again to pump into the condenser C located in the deep sea.

The present OTEC system provides many advantages and very few disadvantages and risks compared to conventional OTEC systems. The condenser C and the evaporator E are parts of the vessel system, removed from the topside of the deck compared to conventional OTEC systems. The evaporator E is used as a mass balance to bring the center of gravity down in the free floating vessel. Thus, the center of gravity is brought below the sea to the desired level required for column stability according to MODU (Mobile Offshore Drilling Unit) conditions. The flash chamber or second evaporator E2 on the top of the deck helps enhance the OTEC system efficiency. Though the evaporator E located in or on the keel tank 23A is a distance below the water surface, the warm water intake pipe 24 is used to provide the warm water from the near free water surface depth. The condenser C is easily lowered or placed over the seabed with the help of the tension base 21. The tension tethers 21A are of relative short length, and may provided with gravity counter weights attached to one end. Hence, the installation of the condenser C is easy and can also be removed from the seabed and relocated to another site when needed. The condenser C is an integral part of the tension base 21 and is directly exposed to the sea water environment and temperature to cool the gas working fluid onto liquid working fluid. Thus, the need for a cold water pipe is eliminated completely. Also direct exposure of the condenser C to the cold water surrounding at about 3,000 ft. eliminates the need for pumping water in and out of the condenser required in conventional OTEC systems.

Table 3, below shows the estimated cost of the semi-submersible floating platform of FIG. 5 with a 100 MW OTEC system. The platform cost is significantly reduced because of the reduced topside load and resultant reduced steel weight of the hull. Additional costs are added for the dynamic positioning system for the vessel. The evaporator cost is reduced because of its integral part of the vessel to balance the counter weight for stability. The condenser is an integral part of the tension base with direct exposure to the sea environment for cooling, thus no intake and outlet of the cold water is needed, and the cold water pipe is eliminated. The installation cost is also reduced because the vessel is self-installed and has self-mobility. Mooring is optional to the vessel. The total cost of the vessel with the OTEC system is approximately $265 million US. Overall there could be 35% to 45% savings in the total capital cost of the present OTEC system.

TABLE 3

Cost Subdivision for 100 MW OTEC Unit

| Sl. No | OTEC System | % Cost | million $ |
|---|---|---|---|
| 1 | Platform Vessel Structure | 23% | 61 |
| 2 | Turbine Generator & Pumps | 26% | 70 |
| 3 | Evaporator | 10% | 26 |
| 4 | Condenser | 12% | 32 |
| 5 | Warm-Water Pipe &Pump | 1% | 3 |
| 6 | Subsidiary Equipment | 5% | 13 |
| 7 | Working Fluid | 6% | 16 |
| 8 | Underwater Cable | 8% | 21 |
| 9 | Installation Cost | 4% | 10 |
| 10 | Operational | 5% | 13 |
|  | Total Cost | 100% | 265 |

The OTEC Power Plant Engine

Figure 6:
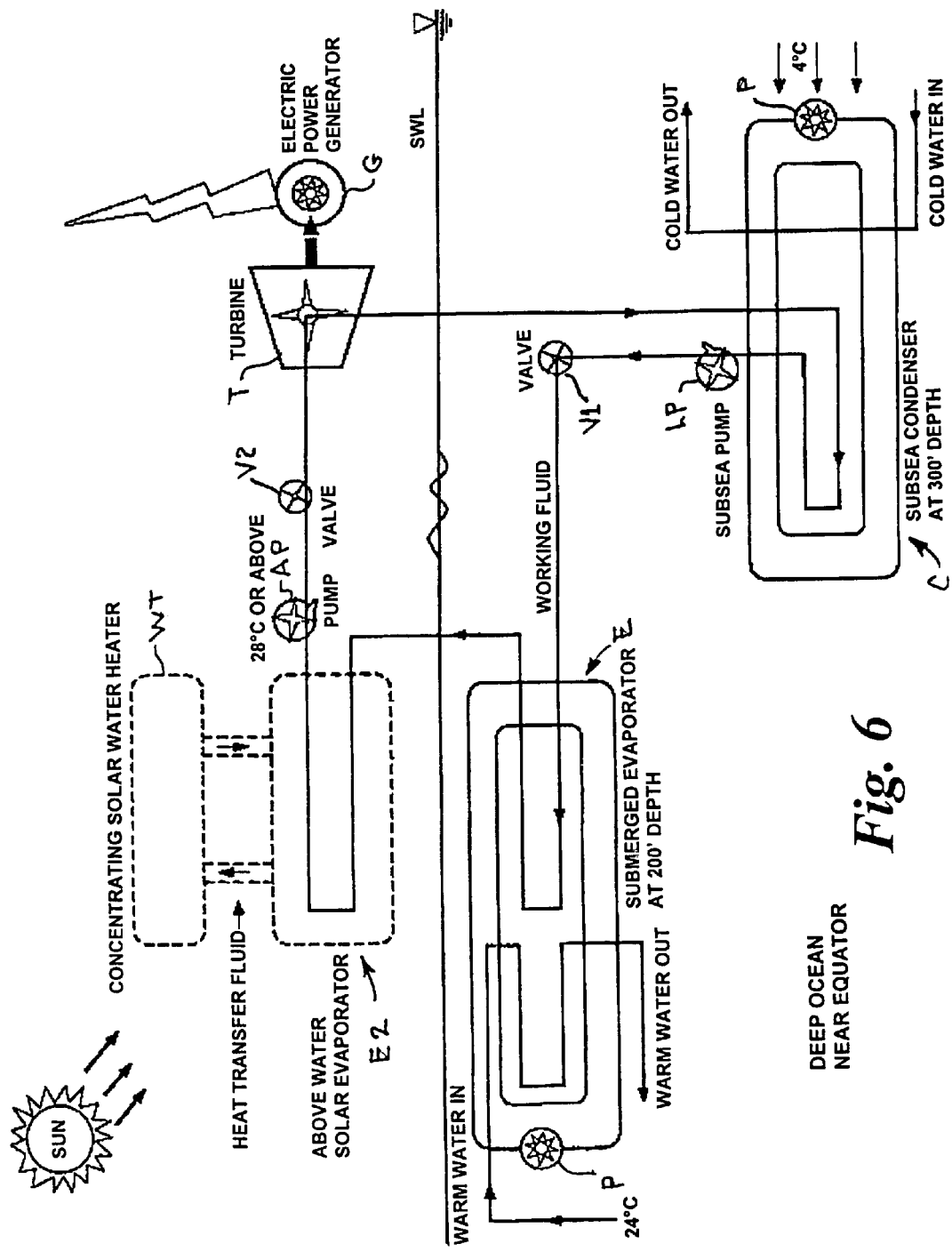
FIG. 6 is a schematic flow diagram illustrating the flow of a preferred embodiment of the OTEC hybrid cycle powerplant engine.

Referring now to FIG. 6 the flow of the working fluid of the preferred embodiment of the OTEC hybrid cycle powerplant engine will be described in greater detail. The present OTEC engine incorporates at least one subsea condenser C, at least one subsea liquid pump LP, at least one submerged evaporator E, and at least one flash chamber or second evaporator E2. The working fluid is transported from outlet of the turbine T to the subsea condenser C through at least one buoyant free standing vertical flow pipe (described hereinafter). The condenser C is located in a subsea area where the enormous cold water is available without the need of storage. The condenser C is directly exposed to the underwater environment of about 4° C. and is designed to withstand 1,500 psi water pressure and operate at approximately 3,000 ft. depths. Hydraulically operated propellers P induct the water of about 4° C. across the condenser as described hereinafter.

The power consumption on the condensed working fluid subsea liquid pump LP is about 33.5% of power generated from the turbine expander. In order to minimize this power loss, two pumps are used; the subsea pump LP and a second axial pump AP above water. The submerged pump LP transports the condensed working fluid through a check valve V1 to the submerged evaporator E, and the working fluid gas passes through the second evaporator E2 at the top of the platform. The submerged evaporator E is disposed at a depth of about 200 ft. and directly exposed to the underwater environment of about 24° C. Hydraulically operated propellers P induct the water of about 24° C. across the submerged evaporator E as described hereinafter. The second axial pump AP is disposed on the platform above water to suck the working fluid gas from the second evaporator E2 and send it through a second check valve V2 to the turbine T for the required input condition. This method reduces the total power consumption needed for the submerged subsea pump LP. The subsea pump LP is a displacement type pump specially designed for the subsea application of the OTEC power plant. The second pump AP which is located above water may be a conventional commercially available pump with large volumetric flow capacity. Alternatively, a blower may be used to draw working fluid gas from the second evaporator E2 and send it to the turbine T. As shown and described hereinafter, the platform may be provided with a solar thermal heating system and water tank WT connected with the second evaporator E2 that further heats the gas working fluid conducted to the turbine inlet in order to improve the performance of the turbine power output.

Platform with 20 MW OTEC System

FIG. 7 shows somewhat schematically a semi-submersible floating platform 25 with telescopic keel tank 25A similar the one described previously but has a lower deck D1 and a top deck D2 which are disposed above the water surface and above the submerged keel tank. The platform 25 is shown in greater detail in FIGS. 8A and 8B, and the components of a 20 MW OTEC system are shown in greater detail in FIGS. 9, 10, 11 and 12.

Figure 8A:
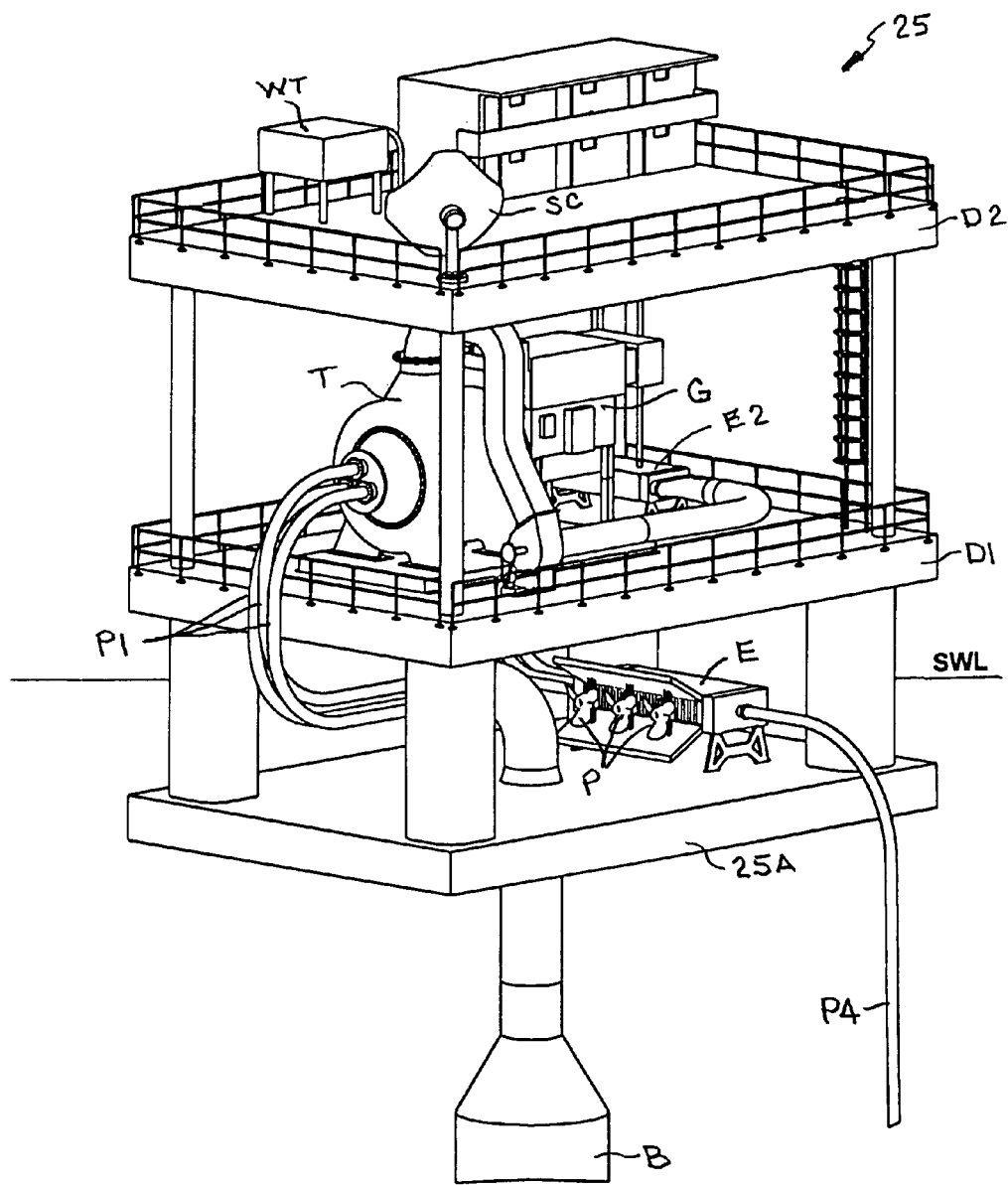
FIGS. 8A and 8B are a perspective view and a side elevation view showing the deck of the semi-submersible floating platform of FIG. 7 in greater detail.
Figure 8B:
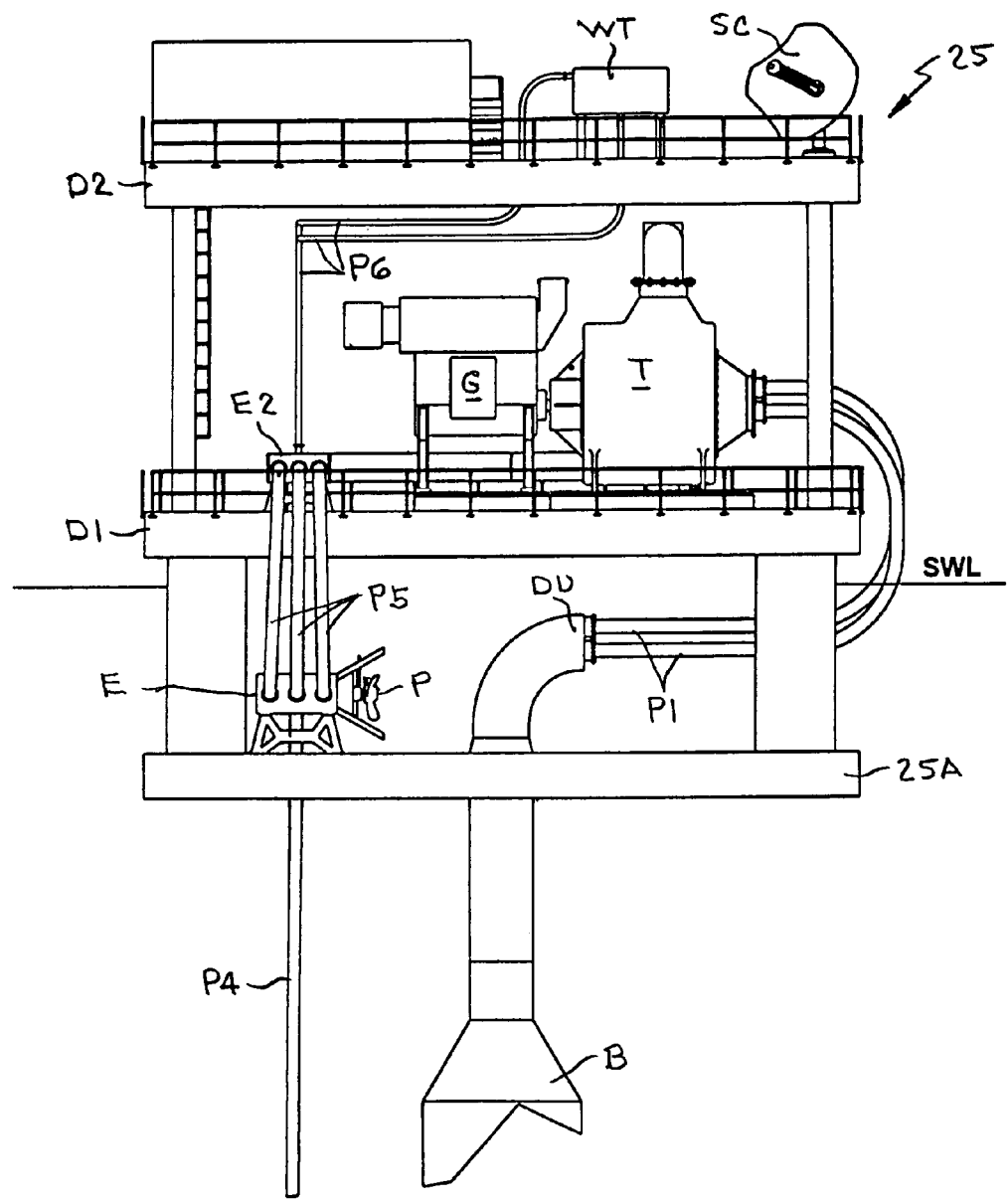

As best seen in FIGS. 8A and 8B, in this embodiment, the submerged evaporator E is mounted on the submerged keel tank 25A; the turbine T, generator G, and the flash evaporator or evaporator E2 are mounted on the lower deck D1 above the water. The top deck D2 is provided with a hot water tank WT and an associated solar thermal heating system which may comprise a parabolic solar reflector or solar concentrator SC which concentrates solar heat onto the water tank WT. Alternatively, solar collectors may be employed to heat the water in the water tank WT.

As shown in FIGS. 7, 9 and 10, the subsea condenser C is supported on the seabed by a water-ballasted box BX. The working fluid is transported from outlet of the turbine T to the inlet of the subsea condenser C through a buoyant free standing vertical flow pipe FP. The vertical flow pipe FP is formed of several sections of pipe which are connected end to end by a swivel joint or ball joint BJ, so as to move independently and eliminate bending of the pipe. The interior of the sections of the vertical flow pipe FP are in fluid sealed communication through the interior of the swivel joint or ball joint BJ. A flexible bypass manifold BM surrounds each swivel joint or ball joint BJ. The bypass manifold BM is formed of several circumferentially spaced smaller diameter pipes BP which diverge outwardly from the joined pipe sections in vertically opposed relation and a section of flexible pipe or hose PF is connected between their opposed facing ends. The interior of the bypass manifolds BM are in fluid communication with the interior of the joined pipe sections above and below the swivel joint or ball joint BJ. Thus, working fluid in the heavier liquid phase can pass downwardly through the pipe sections and swivel joint or ball joints BJ, while working fluid in the lighter vapor or gas phase can pass upwardly through the pipe sections and the bypass manifolds BM.

The uppermost pipe section of the vertical flow pipe FP is provided with a larger diameter buoyant buoy B with a upper diffuser DU at its top end, and the uppermost pipe section is provided with a lower diffuser DL at its bottom end. The upper diffuser DU decreases in diameter and is adjoined to several smaller diameter pipes P1 from the outlet of the turbine T. The lower diffuser DL increases in diameter and is adjoined by several smaller diameter pipes P2 to the intake of the subsea condenser C to supply the hot working fluid gas to the subsea condenser.

The subsea condenser C is an open-shell configuration which incorporates thin rectangular bent tubes disposed in fluid communication between the inlet and the outlet of the condenser. In a preferred embodiment, the rectangular tubes are bent to provide a narrow gap between the tube bends. The tubes are supported by vertical plates to withstand hydrostatic outside water pressure of 1,500 psi. The spacing between the tube bends is designed to allow the surrounding sea water to flow naturally in between the tube bends without resistance. Several propellers P are mounted adjacent to a side of the condenser to induce a stream of cold water flow from one side of the condenser to the other through the space between the tube bends. These subsea propellers are operated hydraulically from the platform deck through flexible hoses. For efficient heat conduction, the subsea condenser tubes may be made of aluminum. Thus, the subsea condenser C is directly exposed to the underwater environment of about 4° C. at approximately a depth of about 3,000 ft. and the hydraulically operated propellers P induct the cold water across the condenser.

The subsea condenser C is elevated a distance above the water-ballasted box BX by a stand. The working fluid outlet of the condenser C is connected by a diffuser and a pipe P3 to a storage tank TS which is below the height of the outlet such that the liquid working fluid flows into the tank by gravity. The tank TS is adjoined to the intake of the subsea liquid pump LP. The subsea pump LP is a displacement type pump specially designed for the subsea application of the OTEC power plant.

Figure 11:
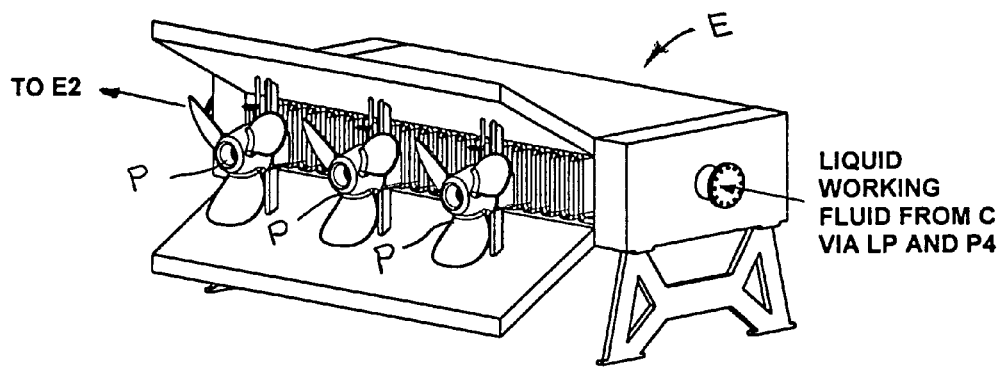
FIG. 11 is a perspective view showing the submerged evaporator of the OTEC system in greater detail.

The submerged pump LP transports the condensed working fluid liquid through a check valve to the inlet of the submerged evaporator E through an elongate flexible pipe P4. As best seen in FIG. 11, the subsea evaporator E has the same open-shell configuration with thin rectangular bent tubes disposed in fluid communication between the inlet and the outlet of the evaporator as the subsea condenser C, described above. The submerged evaporator E is disposed at a depth of about 200 ft. and is directly exposed to the underwater environment of about 24° C. Hydraulically operated propellers P disposed on one side of the evaporator induct the water of about 24° C. across the bent tubes of the submerged evaporator E. The working fluid leaves the submerged evaporator E as a vapor or gas and enters the second evaporator E2 which is disposed on the lower deck D1 above the water surface.

Figure 12:
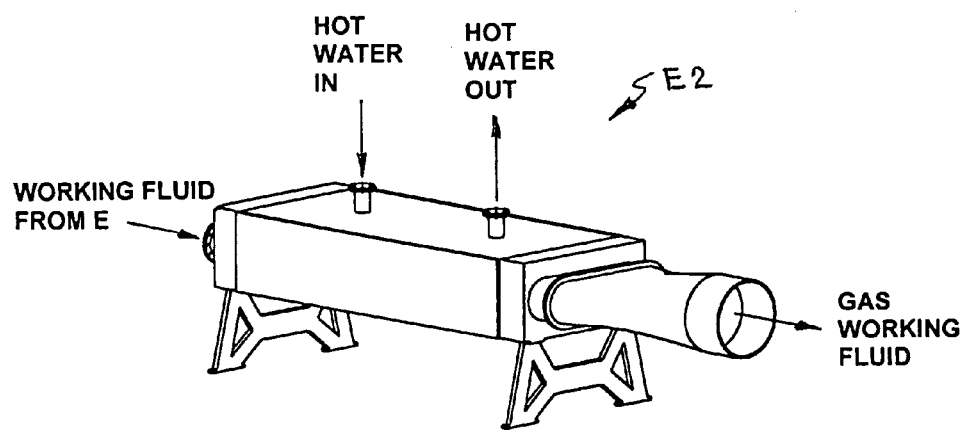
FIG. 12 is a perspective view showing the second evaporator of the OTEC system in greater detail.

As best seen in FIGS. 12 and 8B, the second evaporator E2 has an enclosed housing containing thin rectangular bent tubes disposed in fluid communication between the working fluid inlet and outlet of the evaporator. The working fluid inlet is adjoined to the outlet of the submerged evaporator E by several smaller diameter pipes P5. The working fluid outlet is adjoined by a diffuser and pipe to a blower BL which is connected to the intake of the turbine T. The housing of the second evaporator E2 has a water inlet and water outlet which are connected by pipes P6 to the hot water tank WT on the top deck D2 of the platform.

The parabolic solar reflector or solar concentrator SC on the top deck concentrates solar heat onto the water tank WT and the hot water is circulated across the bent tubes in the housing of the second evaporator E2 to further increase the temperature of the gas working fluid passing therethrough and to the turbine inlet to improve the performance of the turbine power output.

Platform with 100 MW OTEC System

Figure 13:
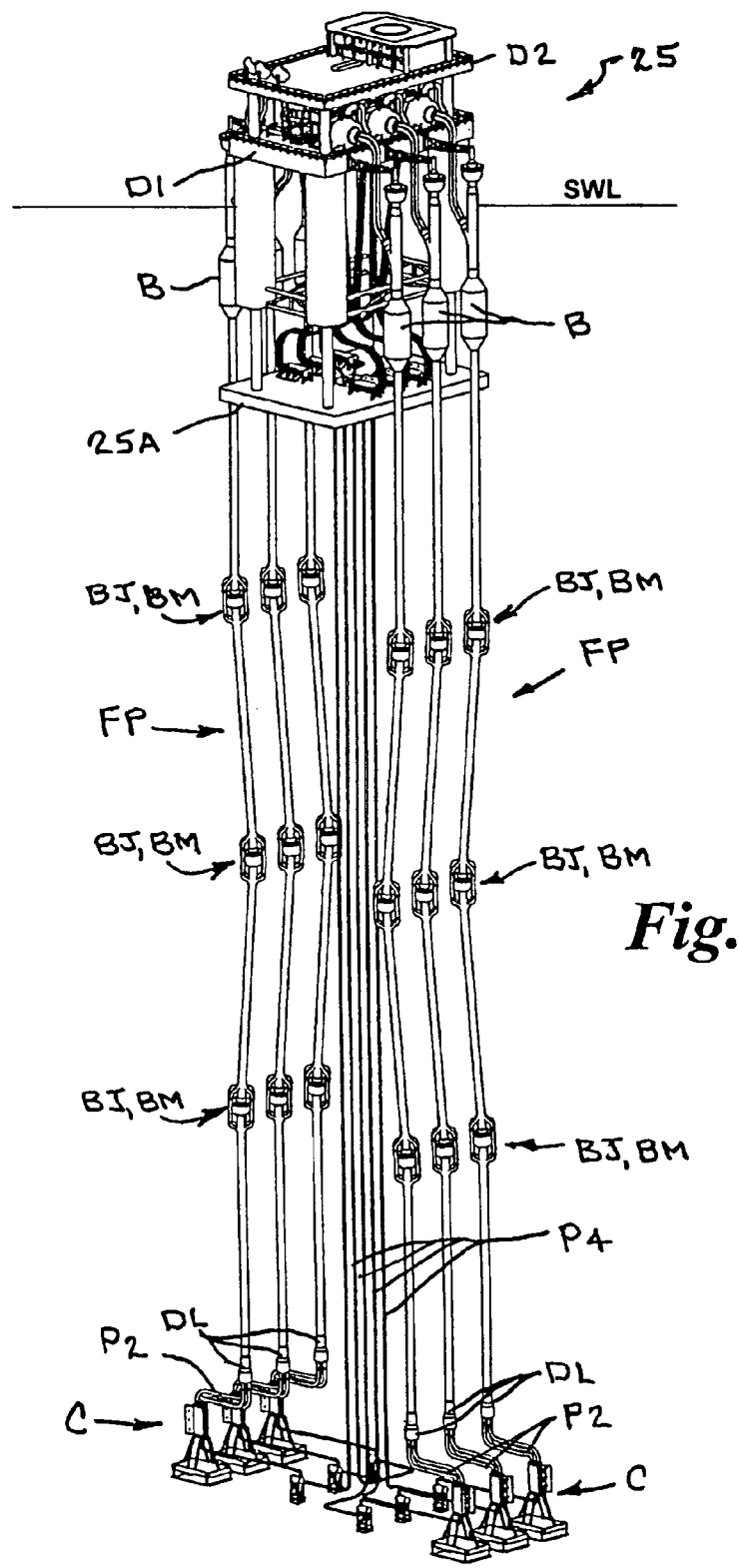
FIG. 13 is a perspective view of a semi-submersible floating platform with telescopic keel tank having a 100 MW ocean thermal energy conversion system in accordance with the present invention.
Figure 14A:
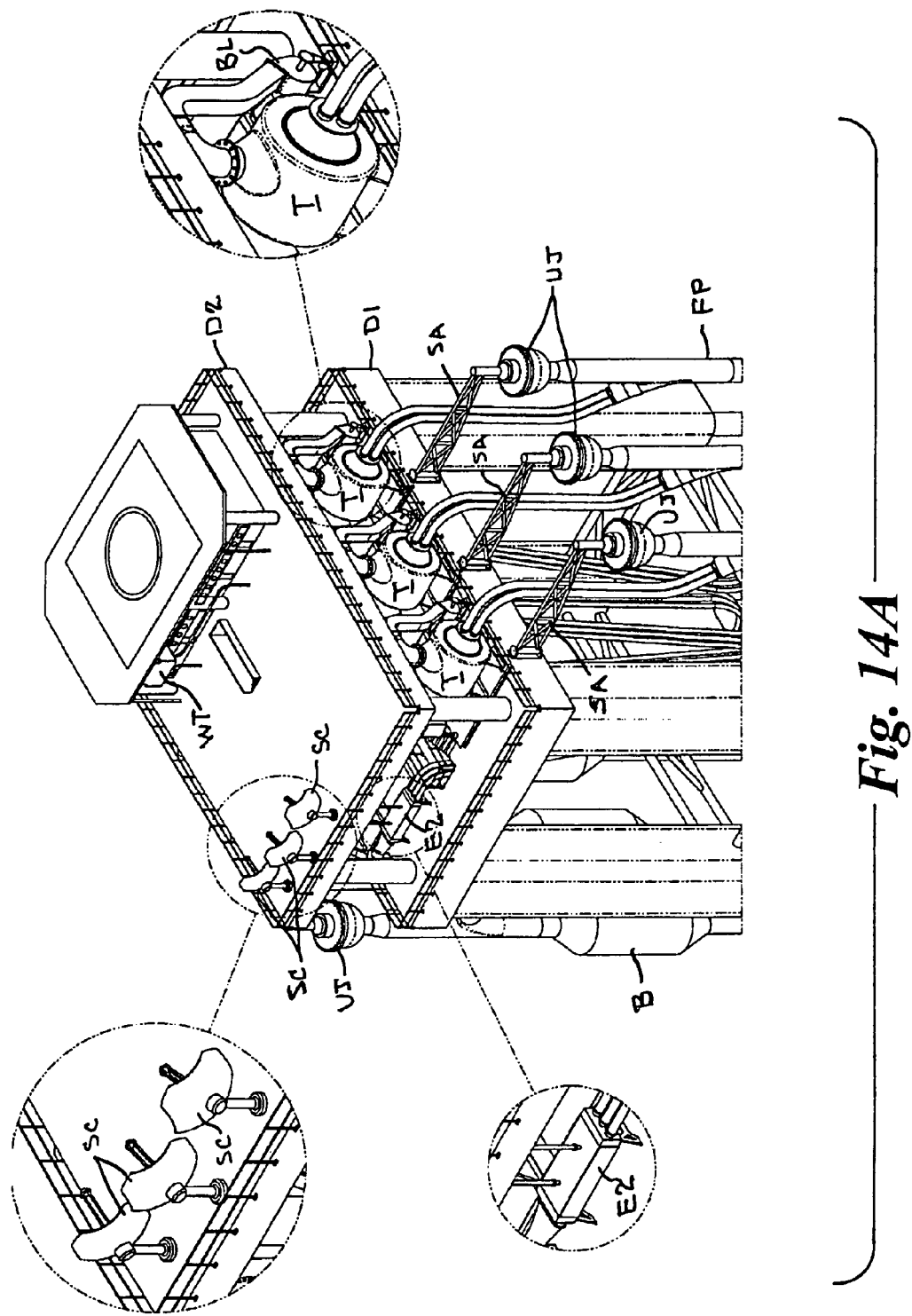
FIGS. 14A and 14B are a perspective view and a side elevation view showing the deck of the semi-submersible floating platform of FIG. 13 in greater detail.
Figure 14B:
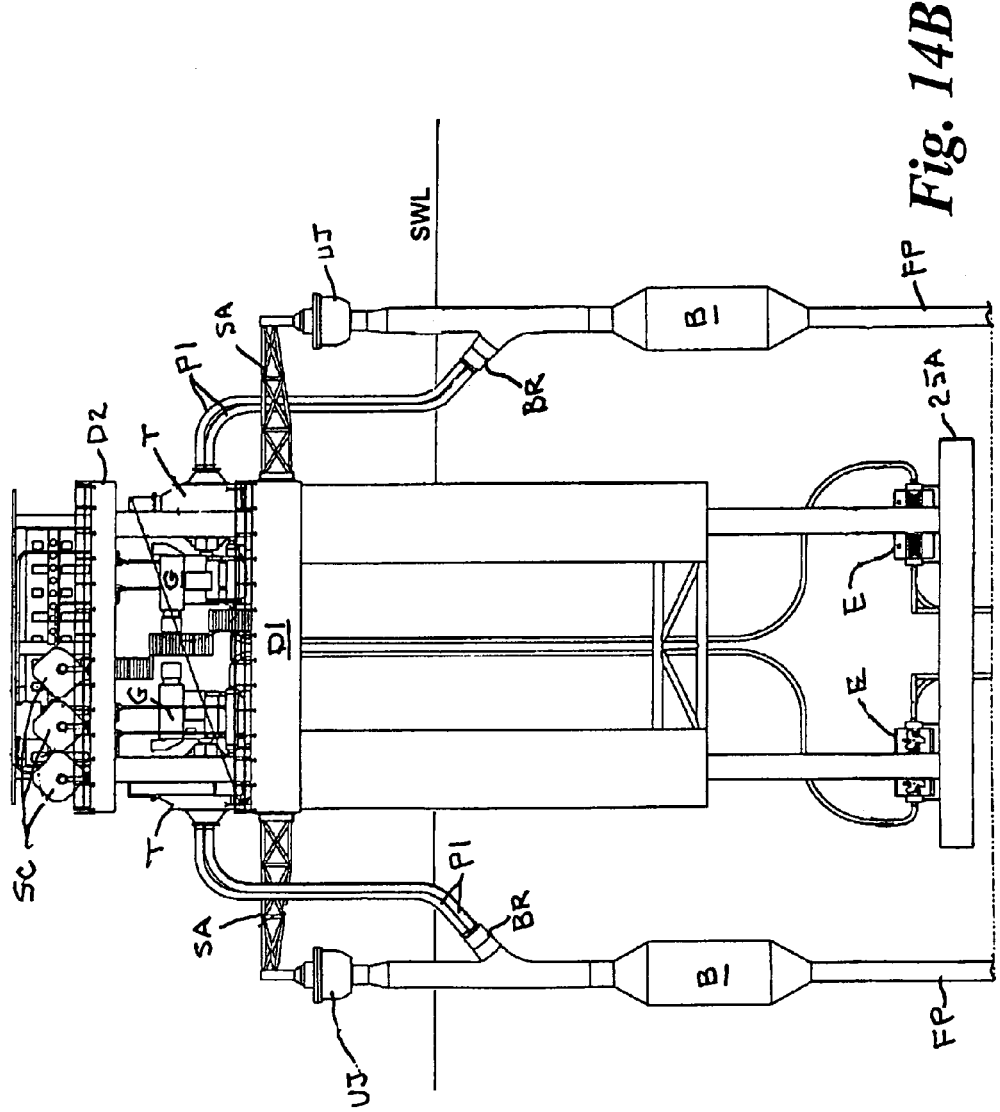
Figure 15:
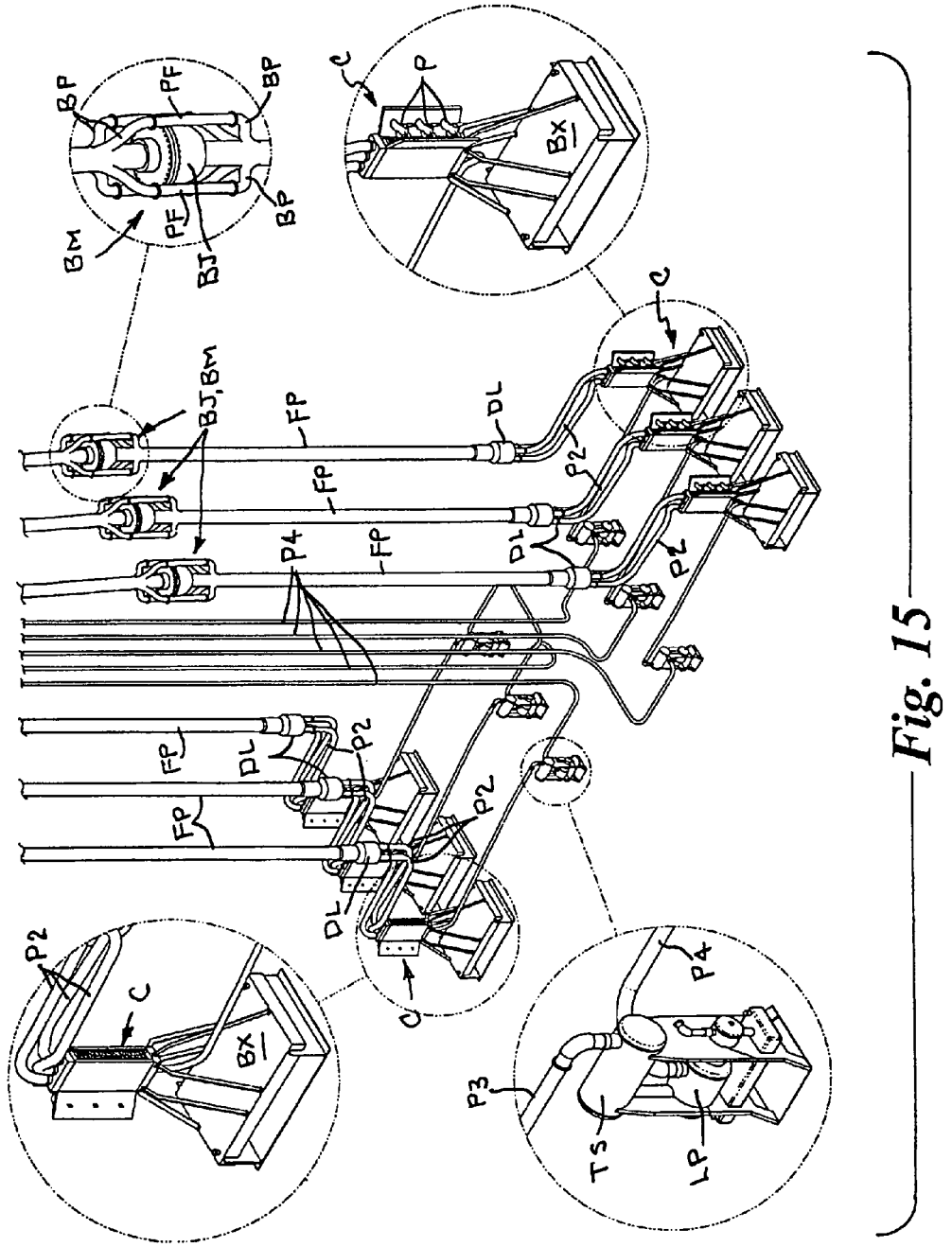
FIG. 15 is a perspective view showing the submerged condensers at the lower end of the buoyant free standing vertical flow pipes in greater detail.

FIG. 13 shows a semi-submersible floating platform 25 with telescopic keel tank 25A equipped with a 100 MW OTEC system. This platform is similar the one described previously and has a lower deck D1 and an upper deck D2 which are disposed above the water surface and above the submerged keel tank, but is larger The components that are the same as previously described above are assigned the same numerals of reference but will not be described again in detail to avoid repetition. FIGS. 14A, 14B and 15 show the platform and the components of the 100 MW OTEC system in greater detail.

In this embodiment, there are six submerged evaporators E mounted on the submerged keel tank 25A; six turbines T, six generators G, and six flash evaporators or second evaporators E2 mounted on the lower deck D1 above the water. The top deck D2 is provided with a hot water tank WT and an associated solar thermal heating system which may comprise several parabolic solar reflectors or solar concentrators SC which concentrate solar heat onto the water tank WT. Alternatively, solar collectors may be employed to heat the water in the water tank WT.

There are also six buoyant free standing vertical flow pipes FP. In this embodiment, the top end of each flow pipe FP has a universal joint UJ above the larger diameter buoyant buoy B which is attached to the outer end of a respective support arm SA which is hingedly connected to the side of the lower deck D1. Each flow pipe FP has an angularly disposed branch BR between the universal joint UJ and the larger diameter buoyant buoy B to which are connected several smaller diameter flexible pipes or hoses P1 which are attached at their other end to the outlet of a turbine T. The working fluid is transported from the outlet of a turbine T through the smaller diameter flexible pipes or hoses P1 to the interior of the vertical flow pipe FP and therethrough to the inlet of a respective subsea condenser C.

The submerged pumps LP transport the condensed working fluid liquid to the inlet of respective submerged evaporators E through elongate flexible pipes P4, and the working fluid leaves the submerged evaporators E as a vapor or gas and enters a respective second evaporator E2 which is disposed on the lower deck D1 above the water surface as described previously. The parabolic solar reflector or solar concentrators SC on the top deck concentrate solar heat onto the water tank WT and the hot water is circulated through the housing of the second evaporator E2 to further increase the temperature of the gas working fluid passing therethrough and to a blower BL which is connected to the intake of the turbine T, as described previously.

Desalination System

Figure 16:
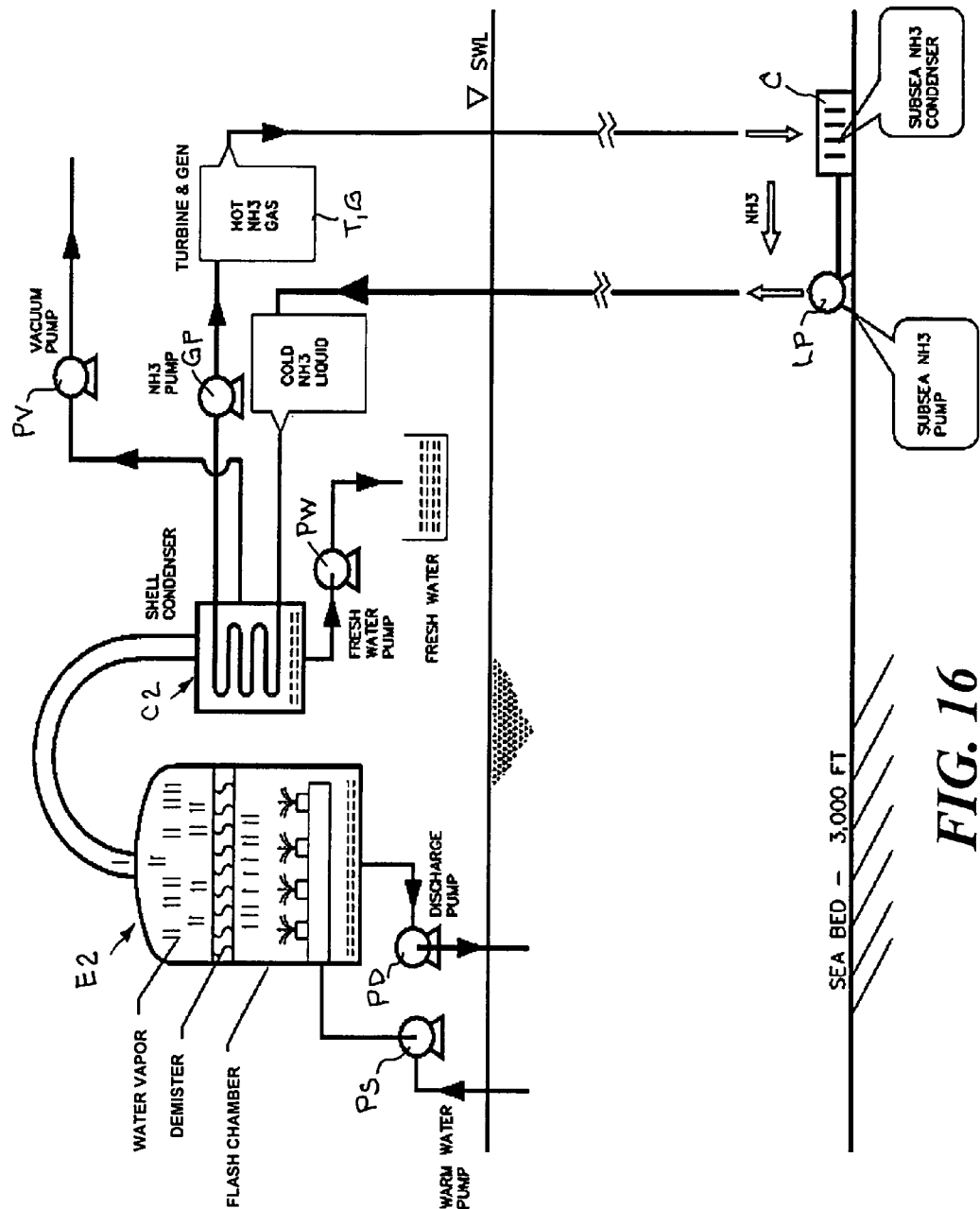
FIG. 16 is a schematically diagram illustrating a desalination system that may be incorporated with the present OTEC power plant.

FIG. 16 shows schematically a desalination system that may be combined and incorporated with the OTEC power plant, shown and described previously with reference to FIG. 6. In this embodiment, the subsea condenser C and subsea pump LP of the OTEC system are are used to cool the working fluid underwater, for example at a depth of about 3,000 ft or less (4° to 12° C.), and and pump the working fluid up to the surface in a closed cycle, as described previously. The desalination system shown in FIG. 16 includes a vacuum flash chamber E2 connected with a shell condenser C2 which is connected with a vacuum pump PV and a fresh water pump PW. The vacuum flash chamber E2 includes a demister, warm water supply pump PS, and a discharge pump PD. The working fluid of the OTEC system is conducted via subsea pump LP through the coils of the shell condenser C2. Warm water (for example 23° to 28° C.) available near the free surface is pumped via warm water supply pump PS into the flash chamber E2 and flashed into steam at low temperature to produce water vapor and then passes into the shell condenser C2. In this embodiment, the vacuum flash chamber E2 together with condenser C2 serves as an evaporator for the working fluid of the OTEC system. The heating required to evaporate the working fluid passing through the coils in condenser C2 is obtained from steam generated in the flash chamber E2. The working fluid is used as a coolant for the steam and the steam is used to heat the working fluid. Thus, the heat exchange process in condenser C2 serves a dual purpose; to condense the steam into clean water, and to evaporate the working fluid by indirect contact. The water vapor condensed in the shell condenser C2 is removed via fresh water pump PW and collected as fresh water. The hot working fluid exiting the coils of the condenser C2 may be pumped via the working fluid pump GP to the turbine T to operate the generator G of the OTEC system (FIG. 6) before being recycled back to the underwater condenser C of the OTEC system with or without the need of additional evaporators from solar or other sources of heat exchange.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An offshore floating ocean thermal energy conversion (OTEC) platform, comprising:
   a spar type floating platform having a buoyant tubular jacket frame column structure with vertical tubular legs, a deck supported at an upper end of said jacket frame, buoyancy capsules disposed within said jacket frame to provide upward force to support said deck above a sea surface, and submerged keel tanks disposed within said jacket frame below said buoyancy capsules, said platform maintained a distance above a seabed by mooring lines extending therebetween;
   at least one turbine and power generator disposed on said deck;
   at least one condenser housed within or on a lowermost one of said keel tanks at a lower end of said jacket frame column connected in fluid communication with a cold water intake pipe extending a distance downwardly from said lower end of said frame for receiving cold sea water, the weight of said condenser acting as a fixed ballast to increase the stability of said platform;
   at least one evaporator housed within said jacket frame beneath said deck disposed above the sea surface and supplied with warm water from near the water surface and connected in fluid communication with said at least one condenser and with said at least one turbine and power generator; and a working fluid capable of changing between a liquid and a vapor or gas is transported through said vertical legs of said jacket frame between said at least one condenser, said at least one evaporator, and said at least one turbine, wherein said working fluid in a liquid phase is transported upwardly through said legs from said at least one condenser to said at least one evaporator where heat is extracted from warm sea waters to vaporize said working fluid from a liquid phase to a gas phase which then passes through said at least one turbine to rotate said at least one turbine and operate said power generator and is transported downwardly through said legs from said at least one turbine back to said at least one condenser where heat is rejected by cold waters at lower depths of the sea to condense the vaporized working fluid to a liquid phase.

2. An offshore floating ocean thermal energy conversion (OTEC) platform, comprising:

a floating tension base tension leg platform (TBTLP) having a plurality of buoyant vertical columns, a deck supported at an upper end of said columns a distance above a sea surface, a buoyant tension base submerged and supported a distance beneath said columns and above the seabed and anchored to the seabed by a lower tether system, and said platform maintained a distance above said buoyant tension base by an upper tether system extending therebetween;

at least one turbine and power generator disposed on said deck;

at least one evaporator disposed on said deck connected in communication with said at least one turbine;

at least one condenser housed within or on said buoyant tension base;

a cold water intake pipe suspended at a top end from said buoyant tension base and connected in fluid communication with said at least one condenser for receiving cold sea water; and a working fluid circulating system having a liquid pump connected in fluid communication with said at least one condenser, flexible conduit extending between said liquid pump and said at least one evaporator, and a gas pump connected in fluid communication with said turbine, flexible conduit extending between said turbine and said at least one condenser; and a working fluid contained in said circulating system capable of changing between a liquid and a vapor or gas; wherein said working fluid in a liquid phase is pumped by said gas pump through said flexible conduit from said at least one condenser within or on said buoyant tension base to said at least one evaporator where heat is extracted from warm sea waters to vaporize said working fluid from a liquid phase to a gas phase which passes through said at least one turbine to rotate said at least one turbine and operate said power generator and is then pumped by said gas pump back to said at least one condenser where heat is rejected by cold waters at lower depths of the sea to condense the vaporized working fluid to a liquid phase.

3. An offshore floating ocean thermal energy conversion (OTEC) platform, comprising:

a mobile semi-submersible floating platform having a plurality of vertical columns, a deck supported at an upper end of said columns a distance above a sea surface, a ballastable keel tank disposed at a bottom end of said columns, and a buoyant tension base submerged and supported a distance beneath said columns and above the seabed and anchored to the seabed by a lower tether system, said platform maintained a distance above said buoyant tension base by a mooring system;

at least one turbine and power generator disposed on said deck;

at least one evaporator disposed on said deck connected in communication with said at least one turbine;

at least one condenser housed within or on said buoyant tension base;

a cold water intake pipe suspended at a top end from said buoyant tension base and connected in fluid communication with said at least one condenser for receiving cold sea water; and a working fluid circulating system having a liquid pump connected with said at least one condenser, flexible conduit extending between said liquid pump and said at least one evaporator, and a gas pump connected with said turbine, flexible conduit extending between said turbine and said at least one condenser; and a working fluid contained in said circulating system capable of changing between a liquid and a vapor or gas; wherein said working fluid in a liquid phase is pumped by said liquid pump through said flexible conduit from said at least one condenser within or on said buoyant tension base to said at least one evaporator where heat is extracted from warm sea waters to vaporize said working fluid from a liquid phase to a gas phase which passes through said at least one turbine to rotate said at least one turbine and operate said power generator and is then pumped by said gas pump back to said at least one condenser where heat is rejected by cold waters at lower depths of the sea to condense the vaporized working fluid to a liquid phase.

4. The offshore floating ocean thermal energy conversion (OTEC) platform according to claim 3, wherein said keel tank is an extensible and retractable keel tank movably supported a distance beneath said columns for extensible and retractable movement relative thereto to selectively raise or lower the center of gravity of the entire mass of the platform with respect to its center of buoyancy according to ballast and variable or fixed loads including deck payloads, to stabilize said platform, and to compensate for different operational, environmental and installation stages of the structure;

said at least one evaporator comprises at least one first evaporator disposed within or on said keel tank connected in fluid communication with said at least one condenser within or on said tension base by flexible conduit, and at least one second evaporator or flash evaporator disposed on said platform deck connected in fluid communication with said at least one first evaporator disposed within or on said keel tank by flexible conduit, and said at least one second evaporator or flash evaporator connected in fluid communication with said at least one turbine and power generator; and said at least one first evaporator disposed within or on said keel tank connected with a warm water intake pipe for receiving warm sea water; wherein said working fluid in a liquid phase is pumped by said liquid pump from said at least one condenser within or on said buoyant tension base through said flexible conduit to said at least one first evaporator disposed within or on said keel tank where it is heated and vaporized by warm sea water to a gas phase which passes through said least one second evaporator or flash evaporator disposed on said platform deck where it is further heated and the heat energy is expanded and passes through said turbine to rotate said turbine and operate said power generator, and then pumped by said gas pump through said flexible conduit from said at least one turbine back to said at least one condenser where it is cooled and condensed to a liquid phase.

5. An offshore floating ocean thermal energy conversion (OTEC) platform, comprising:
a mobile semi-submersible floating platform having a plurality of buoyant vertical columns, a lower deck supported at an upper end of said columns a distance above a sea surface, and a ballastable keel tank movably connected with said columns for extensible and retractable movement relative to a bottom end thereof to selectively raise or lower the center of gravity of the entire mass of said platform with respect to its center of buoyancy according to ballast and variable or fixed loads including deck payloads, to stabilize said platform, and to compensate for different operational, environmental and installation stages of the structure;
at least one turbine and power generator disposed on said lower deck above the sea surface;
at least one first evaporator mounted on said keel tank beneath the sea surface supplied with warm water from the near free water surface and connected in fluid communication with said at least one turbine;
at least one second evaporator or flash evaporator disposed on said lower deck above the sea surface connected in fluid communication with said at least one turbine;
at least one condenser supported on the seabed a distance beneath said platform and said keel tank exposed to the deep sea cold water environment and having working fluid outlets connected by a conduit to a working fluid storage tank disposed below the height of the working fluid outlets of said at least one condenser, and a subsea liquid pump connected in fluid communication between said working fluid storage tank and said at least one first evaporator disposed on said keel tank; and
a working fluid circulating system containing a working fluid capable of changing between a liquid and a vapor or gas including: an elongate flexible conduit extending between said subsea liquid pump and connected in fluid communication through a check valve between said working fluid storage tank and said at least one first evaporator disposed on said keel tank beneath the sea surface, a respective buoyant free standing vertical flow pipe assembly connected in fluid communication between said at least one condenser supported on the seabed and said at least one turbine on said lower deck, and working fluid pipes connected in fluid communication between working fluid outlets of said at least one first evaporator disposed on said keel tank and working fluid inlets of said at least one second evaporator or flash evaporator on said lower deck, and a working fluid outlet pipe in fluid communication through a blower with a working fluid inlets of said at least one turbine; wherein
said working fluid in a liquid phase is transported from said working fluid storage tank by said subsea pump through said elongate flexible conduit up to said at least one evaporator disposed on said keel tank, said at least one first evaporator on said keel tank is supplied with warm water from the near free water surface to heat and vaporize said working fluid to a gas phase which passes to said at least one second evaporator or flash evaporator on said lower deck which further heats and expands the heat energy of the gas phase working fluid which is conducted to said at least one turbine to rotate said turbine and operate said power generator, the heat energy is expended, the gas phase working fluid is exhausted from said at least one turbine and conducted by said free standing vertical flow pipe assembly to said at least one condenser disposed on the seabed; and
said at least one condenser on the seabed cools the gas phase working fluid and converts it into liquid working fluid, and the liquid working fluid flows into said working fluid storage tank to be stored in a cool condition or recycled by said subsea liquid pump in a new cycle.

6. The offshore floating ocean thermal energy conversion (OTEC) platform according to claim 5, wherein
said at least one condenser on the seabed has an open shell housing with laterally opposed open sides, a working fluid inlet and outlet at opposed ends, and rectangular bent tubes disposed in said open shell housing connected in fluid communication between said working fluid inlet and outlet through which said working fluid passes, said bent tubes exposed to the deep sea cold water environment through said laterally opposed open sides of said open shell housing and supported by vertical plates to withstand hydrostatic outside water pressure, said bent tubes bent to define narrow spaces between adjacent tubes to allow surrounding sea water passing between said open sides to flow therebetween; and
at least one propeller mounted adjacent to a first opposed side of said condenser open shell housing to induce a stream of cold water flow from one opposed side to the other opposed side across said bent tubes and through said narrow spaces between said adjacent tubes, and the working fluid leaves said at least one condenser as a liquid and enters said working fluid storage tank to be recycled.

7. The offshore floating ocean thermal energy conversion (OTEC) platform according to claim 5, wherein
said at least one first evaporator on said keel tank has an open shell housing with laterally opposed open sides, a working fluid inlet and outlet, and thin rectangular bent tubes disposed said open shell housing connected in fluid communication between said working fluid inlet and outlet through which said working fluid passes, said bent tubes exposed to warm water from the near free water surface through said laterally opposed open sides of said open shell housing and supported by vertical plates to withstand hydrostatic outside water pressure, said rectangular tubes bent to provide narrow spaces between adjacent tubes to allow surrounding warm sea water to flow therebetween; and
at least one propeller mounted adjacent to a first opposed side of said at least one first evaporator to induce a stream of warm water flow from one opposed side to the other opposed side across said bent tubes and through said narrow spaces between said adjacent tubes, and the working fluid leaves said at least one first evaporator disposed on said keel tank as a vapor or gas and enters said second evaporator or flash evaporator disposed on said lower deck above the water surface.

8. The offshore floating ocean thermal energy conversion (OTEC) platform according to claim 5, wherein
said at least one buoyant free standing vertical flow pipe comprises a plurality of pipe sections connected end to end by a swivel joint or ball joint disposed therebetween, so as to move independently relative to one another and reduce the likelihood of bending, the interior of said pipe sections being in fluid sealed communication through the interior of said swivel joint or ball joint; and a flexible bypass manifold surrounding each said swivel joint or ball joint, said bypass manifold formed of a plurality of circumferentially spaced pipes having a diameter less than said pipe sections of said flow pipe and diverging outwardly from said joined pipe sections of said flow pipe in vertically opposed relation, and a section of flexible conduit connected between opposed facing ends of said circumferentially spaced pipes;

said bypass manifold having an interior in fluid communication with the interior of said connected pipe sections above and below said swivel joint or ball joint, wherein said working fluid in a heavier liquid phase passes downwardly through said pipe sections and swivel joint or ball joints of said flow pipe to said at least one condenser, while working fluid in a lighter vapor or gas phase passes upwardly through said pipe sections and each said bypass manifold to said at least one turbine.

9. The offshore floating ocean thermal energy conversion (OTEC) platform according to claim 8, further comprising:

a buoy on an uppermost pipe section of each said free standing vertical flow pipe section, an upper diffuser at an upper end of said uppermost pipe section above said buoy, and a lower diffuser at a lower end of a lowermost pipe section of said vertical flow pipe;

said upper diffuser decreasing in diameter and adjoined to the working fluid outlet of a respective said turbine by a plurality of smaller diameter flexible conduits, said lower diffuser increasing in diameter and adjoined to the working fluid inlets of a respective said condenser by a plurality of smaller diameter flexible conduits to supply hot working fluid in a gas phase to said respective condenser.

10. The offshore floating ocean thermal energy conversion (OTEC) platform according to claim 5, further comprising:

an upper deck supported a distance above said lower deck;

a hot water tank and a solar thermal heating system disposed on said upper deck, said solar thermal heating system selected from the group consisting of parabolic solar reflectors and solar collectors configured to heat water contained in said hot water tank; and said hot water tank connected with the working fluid coils of said at least one second evaporator or flash evaporator on said lower deck through which the working fluid in a gas phase passes; wherein hot water from said hot water tank is circulated across said coils of said at least one second evaporator or flash evaporator to further increase the temperature of the gas phase working fluid passing therethrough and to said at least one turbine.

11. An offshore floating ocean thermal energy conversion (OTEC) and desalination platform for producing electrical power and desalinated water, comprising:

a mobile semi-submersible floating platform having a plurality of buoyant vertical columns, a deck supported at an upper end of said columns a distance above a sea surface, and a ballastable keel tank movably connected with said columns for extensible and retractable movement relative to a bottom end thereof to selectively raise or lower the center of gravity of the entire mass of said platform with respect to its center of buoyancy according to ballast and variable or fixed loads including deck payloads, to stabilize said platform, and to compensate for different operational, environmental and installation stages of the structure;

a turbine and electrical power generator disposed on said deck above the sea surface;

a flash evaporator disposed on said deck above the sea surface supplied with warm water from the near free water surface by a warm water supply pump and having a vacuum flash chamber including a demister, and a discharge pump;

a closed shell condenser having a shell with an inlet connected with said flash evaporator, a vacuum vacuum pump and a fresh water pump connected with the interior of said closed shell condenser, said closed shell condenser having internal coils through which a working fluid passes, said coils having an inlet and an outlet, said outlet connected with said turbine and electrical power generator;

an open shell working fluid condenser supported on the seabed a distance beneath said platform and said keel tank having laterally opposed open sides, internal coils through which a working fluid passes exposed to the deep sea cold water environment, and at least one propeller mounted adjacent to a first opposed side of said condenser open shell housing to induce a stream of cold water flow from one opposed side to the other opposed side across said internal coils, said open shell working fluid condenser coils having a working fluid inlet connected with said turbine and electrical power generator, and a working fluid outlet connected with said inlet of said closed shell condenser coils; and a working fluid circulating system containing a working fluid capable of changing between a liquid and a vapor or gas including: a first string of elongate flexible conduit connected in fluid communication between said subsea liquid pump and said inlet of said closed shell condenser coils, a second string of elongate flexible conduit connected in fluid communication between said turbine and said inlet of said open shell condenser coils; wherein said working fluid in a liquid phase is transported through said first string of elongate flexible conduit by said subsea pump from said from coils of said open shell working fluid condenser supported on the seabed up and through said coils of said closed shell condenser disposed on said deck above the sea surface, warm water from the near free water surface is pumped via warm water supply pump to the flash chamber and demister of said flash evaporator and flashed into steam at low temperature to produce water vapor which passes into said closed shall condenser and across said coils of said closed shell condenser to vaporize the liquid phase working fluid passing through said coils of said closed shell condenser into a gas phase and condense the steam and water vapor passing thereacross which is collected and removed via said fresh water pump and collected as clean potable water; and the gas phase working fluid is conducted by said vacuum pump from said coils of said closed shell condenser to said turbine to rotate said turbine and operate said power generator, the heat energy is expended, the gas phase working fluid is exhausted from said turbine and conducted by said second string of elongate flexible conduit into said inlet of said open shell condenser coils of said at least open shell condenser disposed on the seabed, and said at least one condenser on the seabed cools the gas phase working fluid and converts it into liquid working fluid to be recycled.

* * * * *